US012505912B2

(12) United States Patent
Leuthardt et al.

(10) Patent No.: US 12,505,912 B2
(45) Date of Patent: Dec. 23, 2025

(54) METHODS AND SYSTEMS FOR RESTING STATE FMRI BRAIN MAPPING WITH REDUCED IMAGING TIME

(71) Applicant: Washington University, St. Louis, MO (US)

(72) Inventors: Eric Leuthardt, St. Louis, MO (US); Joshua Shimony, St. Louis, MO (US); Patrick Luckett, St. Louis, MO (US); John Lee, St. Louis, MO (US)

(73) Assignee: Washington University, St. Louis, MO (US)

( * ) Notice: Subject to any disclaimer, the term of this patent is extended or adjusted under 35 U.S.C. 154(b) by 319 days.

(21) Appl. No.: 17/654,190

(22) Filed: Mar. 9, 2022

(65) Prior Publication Data

US 2022/0293244 A1    Sep. 15, 2022

Related U.S. Application Data

(60) Provisional application No. 63/158,627, filed on Mar. 9, 2021.

(51) Int. Cl.
*G16H 30/20* (2018.01)
*G01R 33/48* (2006.01)
(Continued)

(52) U.S. Cl.
CPC ......... *G16H 30/20* (2018.01); *G01R 33/4806* (2013.01); *G06N 3/0464* (2023.01); *G06N 3/08* (2013.01); *A61B 2576/026* (2013.01)

(58) Field of Classification Search
CPC ........ G16H 30/20; G06N 3/08; G06N 3/0464; G01R 33/4806
See application file for complete search history.

(56) References Cited

U.S. PATENT DOCUMENTS

| 8,020,993 B1 * | 9/2011 | Fram ...................... G06F 3/013 |
| | | 351/200 |
| 9,480,402 B2 | 11/2016 | Leuthardt et al. |

(Continued)

FOREIGN PATENT DOCUMENTS

| FR | 3117329 A1 * | 6/2022 | ......... A61B 5/02007 |
| GB | 2574233 A * | 12/2019 | ............. A61B 5/055 |

(Continued)

OTHER PUBLICATIONS

Mitchell et al., "A Novel Data-Driven Approach to Preoperative Mapping of Functional Cortex Using Resting-State Functional Magnetic Resonance Imaging," Neurosurgery 73:969-983, 2013 DOI: 10.1227/NEU.0000000000000141. (Year: 2013).*

(Continued)

*Primary Examiner* — Jonathon A. Szumny
(74) *Attorney, Agent, or Firm* — Armstrong Teasdale LLP

(57) ABSTRACT

A method for mapping brain function of a subject includes receiving a dataset of resting state fMRI (RS-fMRI) three dimensional (3D) image frames of the subject's brain, and inputting the 3D image frames to a deep learning artificial neural network. For each voxel of each 3D image frame and for each resting state network of a plurality of resting state networks, the deep learning artificial neural network calculates a probability that the voxel belongs to the resting state network. The deep learning artificial neural network is trained beforehand using a plurality of 3D image frames including previously defined resting state networks obtained from a plurality of calibration subjects. The method includes generating one or more functional map of the plurality of resting state networks of the subject's brain using the probabilities calculated by the artificial neural network.

13 Claims, 17 Drawing Sheets
(15 of 17 Drawing Sheet(s) Filed in Color)

(51) Int. Cl.
  *G06N 3/0464* (2023.01)
  *G06N 3/08* (2023.01)

(56) References Cited

U.S. PATENT DOCUMENTS

| | | | | |
|---|---|---|---|---|
| 10,289,903 | B1* | 5/2019 | Chandler | G06N 3/044 |
| 11,651,491 | B2* | 5/2023 | Siemionow | G06T 7/0014 |
| | | | | 382/131 |
| 11,954,578 | B2* | 4/2024 | Meyer | G06N 3/088 |
| 2010/0111386 | A1* | 5/2010 | El-Baz | G06T 7/143 |
| | | | | 382/128 |
| 2010/0268733 | A1* | 10/2010 | Hayaishi | G06F 16/5838 |
| | | | | 707/769 |
| 2011/0304332 | A1* | 12/2011 | Mahfouz | A61F 2/389 |
| | | | | 324/309 |
| 2015/0272468 | A1* | 10/2015 | Liu | A61B 5/0042 |
| | | | | 600/410 |
| 2018/0374213 | A1* | 12/2018 | Arnold | G06N 5/046 |
| 2019/0030371 | A1* | 1/2019 | Han | A61N 5/1039 |
| 2019/0090749 | A1* | 3/2019 | Leuthardt | G06T 7/0012 |
| 2020/0219262 | A1* | 7/2020 | Hsiao | G06V 10/764 |
| 2020/0372637 | A1* | 11/2020 | Ha | A61B 5/7264 |
| 2020/0397293 | A1* | 12/2020 | Peng | A61B 5/0042 |
| 2022/0181005 | A1* | 6/2022 | Narvaez | G06F 12/0802 |

FOREIGN PATENT DOCUMENTS

| | | | | |
|---|---|---|---|---|
| WO | WO-2019077410 | A1 * | 4/2019 | A61B 5/0042 |
| WO | WO-2019106061 | A1 * | 6/2019 | A61B 6/032 |
| WO | WO-2020050721 | A1 * | 3/2020 | G06T 7/0012 |
| WO | WO-2020249359 | A1 * | 12/2020 | G01S 13/89 |

OTHER PUBLICATIONS

Valdes-Sosa et al., "Automatic selection of resting-state networks with functional magnetic resonance imaging," Frontiers in Neuroscience May 2013|vol. 7|Article72 | doi: 10.3389/fnins.2013.00072. (Year: 2013).*

Li et al., "Brain Age Prediction Based on Resting-State Functional Connectivity Patterns Using Convolutional Neural Networks," Proc IEEE Int Symp Biomed Imaging. Apr. 2018 ; 2018: 101-104. doi:10.1109/ISBI.2018.8363532. (Year: 2018).*

Leuthardt et al., "Integration of resting state functional MRI into clinical practice - A large single institution experience," Plos One 13(6): e0198349. https://doi.org/10.1371/journal.pone.0198349. (Year: 2018).*

Dongiovanni et al., "Select and Cluster: A Method for Finding Functional Networks of Clustered Voxels in fMRI," Hindawi Publishing Corporation Computational Intelligence and Neuroscience vol. 2016, Article ID 4705162, 19 pages; http://dx.doi.org/10.1155/2016/4705162. (Year: 2016).*

Naveau et al., "Voxel-based homotopic functional correspondences using functional connectivity analysis of resting state FMRI," Brain Connectivity 2.4: A88-A89. Mary Ann Liebert Inc.(2012); http://dx.doi.org/10.1089/brain.2012.1500. (Year: 2012).*

Kamnitsas et al., "Efficient multi-scale 3D Cnn with fully connected CRF for accurate brain lesion segmentation," Medical Image Analysis 36 (2017) 61-78; http://dx.doi.org/10.1016/j.media.2016.10.004. (Year: 2017).*

"Tensors Explained—Data Structures of Deep Learning," https://deeplizard.com/learn/video/Csa5R12jYRg#:~:text=The%20inputs%2C%20outputs%2C%20and%20transformations,structure%20used%20by%20neural%20networks. (Year: 2018).*

Huang, Gao et al., Convolutional Networks with Dense Connectivity, IEEE Transactions on Pattern Analysis and Machine Intelligence; pp. 1-12.

* cited by examiner

METHODS AND SYSTEMS FOR RESTING STATE FMRI BRAIN MAPPING WITH REDUCED IMAGING TIME

CROSS REFERENCE TO RELATED APPLICATION

This application claims priority to U.S. provisional application No. 63/158,627 filed Mar. 9, 2021, which is incorporated herein in its entirety.

STATEMENT REGARDING FEDERALLY SPONSORED RESEARCH & DEVELOPMENT

This invention was made with government support under CA203861 awarded by the National Institutes of Health. The government has certain rights in the invention.

BACKGROUND

The field of the invention relates generally to the identification of functional networks in the brain derived from functional MRI data. Mapping brain functional brain networks have a wide array of applications, for example, they may be used for brain surgery planning and execution (e.g., brain tumor and epilepsy resection procedures); identifying in patients with various different brain diseases target brain locations to which therapy may be directed; and psychiatric and brain disease diagnostic applications.

In one exemplary example of using functional brain mapping information in connection with resecting brain tumors, a neurosurgeon must balance the benefit of maximal tumor resection against the risk of a functional impairment consequent to more aggressive approaches. These two factors, maximal resection and functional preservation, are often cited in the surgical literature as predictors of long-term survival. Thus, preoperative and intraoperative functional localization is critical to optimizing these often-conflicting priorities. Functional MRI (fMRI) has been used as an adjunct measure for preoperative mapping of functional brain locations that make up what is known as the eloquent cortex, the location of which is particularly important for the neurosurgeon to know in connection with preoperative planning and intraoperative navigation. One alternative way of identifying the location of the eloquent cortex is intraoperative mapping using electrical cortical stimulation mapping, which is performed during the surgery with the patient awake (an awake craniotomy). Since electrocortical stimulation carries clinical risk, preoperative mapping to optimize the intraoperative surgical approach is an effective means of preserving function and may in many cases make an awake craniotomy unnecessary.

fMRI detects changes in the blood oxygen level dependent (BOLD) signal that reflect the neurovascular response to neural activity. In conventional fMRI, function is localized by presenting stimuli or imposing tasks (such as finger tapping or object naming). More recently, resting state fMRI (RS-fMRI), i.e., fMRI obtained in the absence of stimuli or tasks, has been used to map the brain's functional organization. RS-fMRI is a neuroimaging method for studying the connectivity and topography of functional networks in the brain by measuring the ratio of oxyhemoglobin to deoxyhemoglobin uniformly over time. The resulting BOLD signal, and analysis of spontaneous low-frequency (<0.1 Hz) fluctuations in the BOLD signal, allows for the identification of spatial patterns of similarity in the brain. RS-fMRI data are simpler to acquire and do not require patient cooperation (important in children and neurologically impaired patients). RS-fMRI may be used in both clinical and research settings for numerous applications. Thus, RS-fMRI has opened new opportunities for pre-surgical planning.

Current applications of RS-fMRI data include, among those discussed generally above, localization of brain functions for pre-surgical planning in patients with brain tumors and epilepsy. In addition, multiple new applications are currently being investigated and will provide diagnostic information for multiple diseases of the brain. It is well established that larger amounts of RS-fMRI data (requiring longer MRI scanning sessions) provide more accurate characterization of these networks. Typical research applications obtain more than 30 minutes of fMRI data, and one commonly used methodology for acquiring RS-fMRI for clinical application acquires 12 minutes of RS-fMRI data, in two six-minute scanning periods conducted back to back with a short time between the two. It is desirable to minimize the time required for RS-fMRI image acquisition, for a whole host of reasons. For example, a long acquisition time may not be practical for clinical applications where image acquisition time represents cost and ties up an important imaging resource. In addition, sick patients are often uncomfortable in the scanner and may not be able to tolerate long scans without moving. Thus, a method that can decrease the amount of patient MRI scanner time is desirable.

Multiple techniques have been used to map the representation of function using RS-fMRI data. These techniques include independent component analysis, seed-based correlation, and supervised machine learning methods using a neural network architecture known as a multi-layer perceptron (MLP). With typical fMRI acquisition times, at least some known methods are signal to noise limited and have limited sensitivity and specificity.

To date, the majority of research involving RS-fMRI has revolved around the use of seed-based correlation mapping or independent component analysis. These studies have yielded a better understanding of the pathological changes that occur due to Alzheimer's disease, HIV, autism, Parkinson's disease, Down syndrome, and numerous neuropsychiatric disorders. Further and as discussed above, models of RS-fMRI have been used in connection with brain tumor surgery for preoperative and intraoperative functional localization, with the aim being to strike a balance between maximal resection and functional preservation, both of which are predictors of long-term survival and quality of life. Because RS-fMRI has the potential to advance our knowledge of the functional organization of the brain, as well as the pathogenesis of neurological diseases, it is imperative to develop new analysis methods to study resting state networks (RSNs).

Deep learning (DL) is a branch of machine learning that has become widely used in multiple domains. DL is a form of artificial neural networks composed of multiple "hidden" layers between the input and output layers, which simultaneously performs feature selection and input/output mapping by adjusting network weights during training. DL models may include many more parameters than some other known neural networks and other machine learning models. DL models have achieved state-of-the-art performance on numerous tasks, sometimes challenging, if not exceeding, their human counterparts. This has led to the adoption of DL in medical research, with the ultimate goal of achieving precision medicine at the individual patient level. Applications of deep learning to neuroimaging data range from artifact removal, normalization/harmonization, quality enhancement, and lowering radiation/contrast dose. Further, because deep learning is able to detect abstract and complex patterns that are often characterized by subtle, tenuous, and diffuse changes, the application to neuroimaging data with pathology has allowed for the identification of novel biomarkers of disease manifestation and evolution.

This background section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of this disclosure is a method for mapping brain function of a subject. The method includes receiving a dataset of resting state fMRI (RS-fMRI) three dimensional (3D) image frames of the subject's brain. The dataset includes less than about 200 3D image frames. The 3D image frames are input to an artificial neural network, wherein for each voxel of each 3D image frame and for each resting state network of a plurality of resting state networks, the artificial neural network calculates a probability that the voxel belongs to the resting state network. The artificial neural network is trained beforehand using a plurality of 3D image frames including previously defined resting state networks obtained from a plurality of calibration subjects. One or more functional map of the plurality of resting state networks of the subject's brain is generated using the probabilities calculated by the artificial neural network.

According to another aspect of this disclosure, a method for mapping brain function of a subject includes receiving a dataset of resting state fMRI (RS-fMRI) three dimensional (3D) image frames of the subject's brain, and inputting the 3D image frames to a deep learning artificial neural network. For each voxel of each 3D image frame and for each resting state network of a plurality of resting state networks, the deep learning artificial neural network calculates a probability that the voxel belongs to the resting state network. The deep learning artificial neural network is trained beforehand using a plurality of 3D image frames including previously defined resting state networks obtained from a plurality of calibration subjects. The method includes generating one or more functional map of the plurality of resting state networks of the subject's brain using the probabilities calculated by the artificial neural network.

Another aspect is a method for mapping of brain function of a subject for a purpose for which a first number of resting state fMRI (RS-fMRI) three dimensional (3D) image frames of the subject's brain is typically acquired. The method includes receiving a dataset of RS-fMRI 3D image frames of the subject's brain, the dataset comprising less than half of the first number of 3D image frames, and inputting the 3D image frames to an artificial neural network. For each voxel of each 3D image frame and for each resting state network of a plurality of resting state networks, the artificial neural network calculates a probability that the voxel belongs to the resting state network. The artificial neural network is trained beforehand using a plurality of 3D image frames including previously defined resting state networks obtained from a plurality of calibration subjects. One or more functional map of the plurality of resting state networks of the subject's brain is generated using the probabilities calculated by the artificial neural network.

Still another aspect of the disclosure is a method for mapping functions of the brain including receiving an MRI data set for a subject comprising fMRI data acquired with the subject lying in MRI scanning equipment in a state of rest, generating, from the MRI data set, a voxel-wise correlation map that identifies, for each of a plurality of volume element (voxel) of the brain, a measure of the degree of time correlation between spontaneous brain activations at one voxel of the brain as revealed in the resting-state fMRI data and spontaneous brain activations at each of the other voxels of the plurality of bran voxels as revealed in the resting-state fMRI data. The voxel-wise correlation map is input to a trained three-dimensional convolutional neural network based machine learning algorithm to generate at least one functional connectivity map identifying a location where a predefined brain function is performed within the subject's brain by identifying the voxels involved in performing that predefined brain function, and an output of the at least one functional connectivity map is generated.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding parts throughout the drawings.

DETAILED DESCRIPTION OF THE DRAWINGS

The exemplary systems, apparatus, and methods described herein overcome at least some known disadvantages associated with the length of time associated to obtain function brain mapping. The approach described herein allows for high quality brain maps from a shorter amount of MRI time and from less MRI data. This makes brain mapping easier to implement because it does not compete with other imaging sequences. Additionally, with a similar amount of MRI data as used in other methods, the techniques described herein may result in improved (e.g., more accurate) analysis as compared to the other methods.

Figure 1:
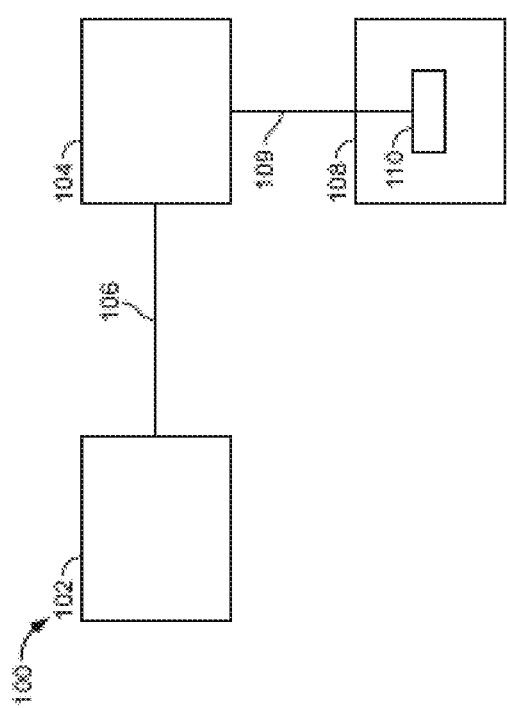
FIG. 1 is a block diagram of an exemplary system for task-less mapping of brain activity.

FIG. 1 illustrates an exemplary system 100 for mapping brain activity of a subject (not shown). It should be noted that the term "brain activity" as used herein includes the various activities within a brain of the subject that correspond to various tasks performed by the subject. For example, the brain transmits and receives signals in the form of hormones, nerve impulses, and chemical messengers that enable the subject to move, eat, sleep, and think. In the exemplary embodiment, system 100 is used to identify locations within a plurality of networks within the brain that are responsible for such brain activities.

As seen in FIG. 1, system 100 includes a sensing system 102 that is configured to detect or acquire a plurality of measurements of brain activity that is representative of at least one parameter of the brain of a subject during a resting state. In one suitable embodiment, sensing system 102 is a magnetic resonance imaging device (MRI) that is configured to generate at least one spectroscopic signal representative of a plurality of measurements of brain activity that is representative of at least one parameter of the brain of the subject during a resting state. More specifically, sensing system 102 may generate an altered magnetic field within the brain to measure various parameters of the brain. In the example embodiment, sensing system 102 is a specialized MRI, such as a functional magnetic resonance imaging (fMRI) device that is used to measure a variation in blood flow (hemodynamic response) related to neural activity in the brain or spinal cord (not shown) of the subject. In one example, the subject may lie within the sensing system 102 (e.g., within an MRI scanner) in a state of quiet wakefulness, looking at a set of cross hairs presented in front of the subject's eyes within the scanner, and in this resting state, blood oxygen level dependent (BOLD) data from locations throughout the subject's brain are acquired, thereby acquiring RS-fMRI data for the subject which may then be later subjected to software processing to generate a functional mapping. It should be noted that the present disclosure is not limited to any one particular type of imaging and electrical technique or device, and one of ordinary skill in the art will appreciate that the current disclosure may be used in connection with any type of technique or device that enables system 100 to function as described herein.

In the exemplary embodiment, system 100 also includes a computing device 104 coupled to sensing system 102 via a data conduit 106. The reference number 104 may be representative of multiple different computing systems located at different locations, for example (i) one computing system may be involved in controlling operation of the image acquisition process and as such may be co-locating with the MRI scanning equipment, (ii) another computing system involved in communicating and storing acquired RS-fMRI image data in an image repository (database) where the image data may be retrieved for further processing (e.g., the functional mapping function), and (iii) another computing system used in performing the mapping functions to generate the functional mapping output that may be stored in the same or a different image repository as the related acquired RS-fMRI image data used to generate the mapping output are stored, such that the mapping output may then be accessed for use in making medical interpretations and diagnoses including use in connection with pre-operative planning and in the operating room which may involve loading the output mapping on a separate surgical navigation system. One or more of the computing systems making up the computing device 104 may, in one embodiment, comprise a picture archiving and communication system (PACS).

It should be noted that, as used herein, the term "couple" is not limited to a direct mechanical, electrical, and/or communication connection between components, but may also include an indirect mechanical, electrical, and/or communication connection between multiple components. Sensing system 102 may communicate with computing device 104 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11 (n)), the Worldwide Interoperability for Microwave Access (WIMAX®) standard, a short-range wireless communication channel such as BLUETOOTH®, a cellular phone technology (e.g., the Global Standard for Mobile communication (GSM)), a satellite communication link, and/or any other suitable communication means. IEEE is a registered trademark of the Institute of Electrical and Electronics Engineers, Inc., of New York, New York. WIMAX is a registered trademark of WiMax Forum, of Beaverton, Oregon. BLUETOOTH is a registered trademark of Bluetooth SIG, Inc. of Kirkland, Washington. Although illustrated collocated with the sensing system 102, the computing device 104 may be located remote from the sensing system 102, and may include a cloud computing device, a distributed computing device, or any other suitable computing device. Moreover, more than one computing device 104 may be used to perform the actions described herein.

In the exemplary embodiment, computing device 104 is configured to receive at least one signal representative of a plurality of measurements of brain activity from sensing system 102. More specifically, computing device 104 is configured to receive at least one signal representative of an altered magnetic field within the brain of the subject from sensing system 102. Alternatively, computing device 104 may be configured to receive at least one signal representative of at least one voltage fluctuation within the brain from at least one electrode.

System 100 also includes a data management system 108 that is coupled to computing device 104 via a network 109. Data management system 108 may be any device capable of accessing network 109 including, without limitation, a desktop computer, a laptop computer, or other web-based connectable equipment. The data management system 108 may be, or be part of, a PACS. More specifically, in the exemplary embodiment, data management system 108 includes a database 110 that includes previously acquired data of other subjects. In the exemplary embodiment, database 110 can be fully or partially implemented in a cloud computing environment such that data from the database is received from one or more computers (not shown) within system 100 or remote from system 100. In the exemplary embodiment, the previously acquired data of the other subjects may include, for example, a plurality of measurements of brain activity that is representative of at least one parameter of a brain of each of the subjects during a resting state. Database 110 can also include any additional information of each of the subjects that enables system 100 to function as described herein.

Data management system 108 may communicate with computing device 104 using a wired network connection (e.g., Ethernet or an optical fiber), a wireless communication means, such as, but not limited to radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. More specifically, in the exemplary embodiment, data management system 108 transmits the data for the subjects to computing device 104. While the data is shown as being stored in database 110 within data management system 108, it should be noted that the data of the subjects may be stored in another system and/or device. For example, computing device 104 may store the data therein.

During operation, while the subject is in a resting state for example as described above (with the subject lying in the MRI scanning equipment in a state of quiet wakefulness), sensing system 102 uses a magnetic field to align the magnetization of some atoms in the brain of the subject and radio frequency fields to systematically alter the alignment of this magnetization. As such, rotating magnetic fields are produced and are detectable by a scanner (not shown) within sensing system 102. More specifically, in the exemplary embodiment, sensing system 102 detects a plurality of measurements of brain activity that is representative of at least one parameter of the brain of the subject during the resting state. Sensing system 102 also generates at least one spectroscopic signal representative of the plurality of measurements (e.g., RS-fMRI scan data) and transmits the signal(s) to computing device 104 via data conduit 106. Moreover, data of other subjects may be transmitted to computing device 104 from database 110 via network 109. As explained in more detail below, computing device 104 may also be used to further process RS-fMRI scan data to generate at least one functional map, such as a functional connectivity map, for each of the measurements based on a comparison of at least one resting state data point of the subject and a corresponding data point from the previously acquired data set from at least one other subject. Computing device 104 uses the map to categorize or classify the brain activity in a plurality of networks in the brain.

Figure 2:
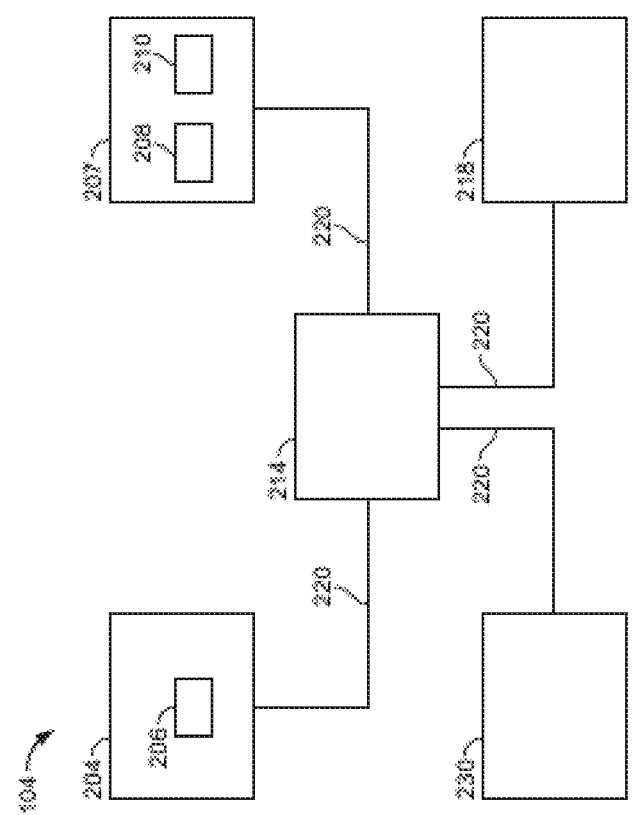
FIG. 2 is a block diagram of an exemplary computing device of the system shown in FIG. 1.

FIG. 2 is a block diagram of computing device 104, which again, as discussed above, may represent multiple different computing systems performing different functions (e.g., controlling the RS-fMRI image acquisition, performing the functional mapping processing on acquired RS-fMRI data, and performing image communication and archiving functions). In the exemplary embodiment, computing device 104 (and each of multiple different computing systems represented by device 104) includes a user interface 204 that receives at least one input from a user, such as an operator of sensing system 102 (shown in FIG. 1). User interface 204 may include a keyboard 206 that enables the user to input pertinent information. User interface 204 may also include, for example, a pointing device, a mouse, a stylus, a touch sensitive panel (e.g., a touch pad, a touch screen), a gyroscope, an accelerometer, a position detector, and/or an audio input interface (e.g., including a microphone).

Moreover, in the exemplary embodiment, computing device 104 includes a presentation interface 207 that presents information, such as input events and/or validation results, to the user. Presentation interface 207 may also include a display adapter 208 that is coupled to at least one display device 210. More specifically, in the exemplary embodiment, display device 210 may be a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 104 also includes a processor 214 and a memory device 218. Processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. Computing device 104, in the exemplary embodiment, may also include a communication interface 230 that is coupled to processor 214 via system bus 220. Moreover, communication interface 230 is communicatively coupled to sensing system 102 and to data management system 108 (shown in FIG. 1).

In the exemplary embodiment, processor 214 may be programmed by encoding an operation using one or more executable instructions and providing the executable instructions in memory device 218. In the exemplary embodiment, processor 214 is programmed to select a plurality of measurements that are received from sensing system 102 of brain activity that is representative of at least one parameter of the brain of the subject during a resting state. The plurality of measurements may include, for example, a plurality of voxels of at least one image of the subject's brain, wherein the image may be generated by processor 214 within computing device 104. The image may also be generated by an imaging device (not shown) that may be coupled to computing device 104 and sensing system 102, wherein the imaging device may generate the image based on the data received from sensing system 102 and then the imaging device may transmit the image to computing device 104 for storage within memory device 218. Alternatively, the plurality of measurements may include any other type measurement of brain activity that enables system 100 to function as described herein.

Processor 214 may also be programmed to perform a correlation analysis. More specifically, in the exemplary embodiment, processor 214 may be programmed to compare at least one data point from each of the plurality of measurements with a corresponding data point from a previously acquired data set from at least one other subject. For example, processor 214 may be programmed to compare a resting state data point from each selected voxel from an image of the subject with a corresponding data point that is located within the same voxel of the previously acquired data set of the other subject. Processor 214 may also be programmed to produce at least one map (not shown in FIG. 2) of the brain of the subject, such as a functional connectivity map, for each of the plurality measurements.

Processor 214 may also be programmed to categorize or classify the measured brain activity in a plurality of networks in the brain based on the map. For example, processor 214 may be programmed to categorize the measured brain activity to a particular neural network of the brain of the subject based on the location of the measured brain activity on the map of the subject's brain.

During operation, as the subject is in a resting state, sensing system 102 detects a plurality of measurements of brain activity that is representative of at least one parameter of the brain of the subject. Sensing system 102 transmits at least one signal representative of the measurements to computing device 104 via data conduit 106. More specifically, the signals are transmitted to and received by communication interface 230 within computing device 104. Communication interface 230 then transmits the signals to processor 214 for processing and/or to memory device 218, wherein the data may be stored and transmitted to processor 214 at a later time. Processor 214 may generate an image of the plurality of measurements. Alternatively, sensing system 102 may transmit the signals to an imaging device (not shown), wherein an image of the measurements may be generated. The image may then be transmitted to computing device 104, wherein the image is stored within memory device 218 and transmitted to processor 214 for processing.

Moreover, data of other subjects may be transmitted to computing device 104 from database 110 (shown in FIG. 1) via network 109 (shown in FIG. 1). More specifically, the data may be received by communication interface 230 and then transmitted to processor 214 for processing and/or to memory device 218, wherein the data may be stored and transmitted to processor 214 at a later time. Computing device 104 may obtain the data at any time during operation.

In the exemplary embodiment, computing device 104 produces at least one map for each of the plurality of measurements received. More specifically, processor 214 first selects each of the plurality of measurements, received from sensing system 102. For example, in the exemplary embodiment, processor 214 selects each of the volume elements (voxels) from the image. Alternatively, processor 214 may select any other types of measurements for brain activity that enables system 100 to function as described herein. Moreover, a user may see the image on the computing device 104, via presentation interface 207, and select the measurements, such as voxels, via user interface 204.

When each of the measurements has been selected, processor 214 then performs a correlation analysis. More specifically, processor 214 compares at least one data point from each of the selected measurements with a corresponding data point from a previously acquired data set from at least one other subject, wherein computing device 104 obtained the data set from database 110. For example, processor 214 may compare at least one resting state data point from each selected voxel of the image of the subject with a data point that is located within the same voxel of the previously acquired data set of at least one other subject.

When processor 214 has completed the correlation analysis, processor 214 then produces at least one map (not shown in FIG. 2) of the brain of the subject, such as a functional connectivity map, for each of the measurements. More specifically, processor 214 produces a map of the brain of the subject based on each of the comparisons of each of the resting state data points and the corresponding previously acquired data points. The map, for example, may illustrate the location within the brain of a measured brain activity. Processor 214 then categorizes or classifies the measured brain activity in a plurality of networks in the brain based on the map. For example, based on the location of the measured brain activity in the map, processor 214 categorizes the measured brain activity to a particular neural network of the brain of the subject. The map may be presented to the user via presentation interface 207. Moreover, a textual representation and/or a graphical output for the various categorizations may also be presented to the user via presentation interface 207.

An example description of the use of the system 100 and the computing device 104 will be described below with reference to the brain's language function mapping or localization, but the methods and systems described herein may be applied to detection and mapping of any functional neural networks. The language function is considered part of the brain's eloquent cortex, which also includes the brain's sensorimotor and vision functional networks.

Pre-surgical functional localization of eloquent cortex with task-based functional MRI (T-fMRI) is part of the current standard of care prior to resection of brain tumors. Resting state fMRI (RS-fMRI) is an alternative method. Group level language localization can be compared using T-fMRI vs. RS-fMRI analyzed with 3D deep convolutional neural networks (3DCNN).

In one example, data was obtained in 35 patients with brain tumors that had both language T-fMRI and RS-MRI scans was analyzed during pre-surgical evaluation. The T-fMRI data were analyzed using conventional techniques. The language associated resting state network was mapped using a 3DCNN previously trained with data acquired in >2,700 normal subjects. Group level results obtained by both methods were evaluated using receiver operator characteristic analysis of probability maps of language associated regions, taking as ground truth meta-analytic maps of language T-fMRI responses generated on the Neurosynth platform.

Both fMRI methods localized major components of the language system (areas of Broca and Wernicke). Word-stem completion T-fMRI strongly activated Broca's area but also several task-general areas not specific to language. RS-fMRI provided a more specific representation of the language system.

3DCNN was able to accurately localize the language network. Additionally, 3DCNN performance was remarkably tolerant of a limited quantity of RS-fMRI data. Without being bound to any particular theory, the system using the 3DCNN may outperform some other known systems (such as those using a multilayer perceptron) because resting state fMRI contains a high degree of spatial correlation at the voxel level (i.e. in general, voxels that are close to each other are more correlated than voxels that are further from each other). Although, a multilayer perceptron (MLP) and convolutional neural networks (CNN) can both be used for image classification/segmentation, a MLP takes a vector (1×N) as an input and CNN takes a tensor (multidimensional vector) as an input. For example, the three dimensional fMRI brain images used herein are dimension [48, 64, 48]. In order for this to be processed by the MLP, it must be reduced down to a vector. This means the values are translated from something that is [48, 64, 48] down to something that is approximately [1,147456]. Once the data is "vectorized", there is no longer a spatial relationship, and the network can no longer leverage this information to make accurate predictions. This is very important because, while there is significant variability in network boundaries at the individual level, overall these networks are located in the same general regions. The 3DCNN is designed to account for the spatial relationship between voxels by performing three dimensional convolutions. Thus, the 3DCNN can take the [48, 64, 48] volume directly as an input to the model. CNNs were designed specifically for operating on images (of any kind), because all images generally contain multiple, highly correlated components that are separated by moderately well-defined boundaries.

This patient cohort was used in a prior study targeting non-invasive localization of sensorimotor cortex. The following inclusion criteria were used: new diagnosis of primary brain tumor; age above 18 years; clinical need for an MRI scan including fMRI for presurgical planning as determined by the treating neurosurgeon. Additionally, patients had both a language task (word-stem completion) T-fMRI and RS-fMRI. Exclusion criteria included: prior surgery for brain tumor, inability to have an MRI scan, or a patient referred from an outside institute with an MRI scan. The cohort included N=35 patients (male/female 23/12) with a mean age of 44.8 years (23-71 years range). The mean preoperative enhancing tumor volume was 43.8 mL (range: 1.4-207 mL); 28 patients had a left-hemisphere tumor; pathology was most often oligoastrocytoma (11 cases) and glioblastoma (10 cases). Handedness was recorded in 26 patients. To decrease any uncertainty in regard to laterality the laterality index (LI) was included for all subjects based on previous work. Since the 3 left handed patients had LI>0, and two of the three patients with LI<0 were right handed (the handedness on the third was not available) language activation was averaged in all subjects as a single group. Patient demographics are summarized in Table 1. Clinical data were acquired during preoperative evaluation and reviewed retrospectively.

TABLE 1

Patient clinical and demographic data.

| Patient ID (N = 35) | Age (years) | Handedness Lat. index | Tumor location | Tumor size (mL) | Tumor pathology |
| --- | --- | --- | --- | --- | --- |
| RS_003 | 40-45 | R/−0.11 | Left basal ganglia | 8.7 | Glioblastoma |
| | | | Left temporal lobe | 4.8 | |
| RS_004 | 20-25 | R/0.04 | Left frontal lobe | 56.2 | Anaplastic glioma |
| RS_005 | 35-40 | NA/−0.08 | Left frontal lobe | 1.2 | Anaplastic mixed oligoastrocytoma |
| | | | Left frontal lobe | 0.2 | |
| RS_006 | 35-40 | NA/0.32 | Left inferior frontal lobe | 81.1 | Anaplastic mixed oligoastrocytoma |
| RS_007 | 60-65 | R/0.15 | Left parieto-occipital | 85.1 | Glioblastoma |
| RS_009 | 60-65 | R/0.10 | Left peri-trigonal area | 147 | Glioblastoma |
| RS_011 | 20-25 | R/0.67 | Left frontotemporal | 56.4 | Mixed oligoastrocytoma |
| RS_012 | 40-45 | R/0.38 | Left frontal lobe | 7.5 | Anaplastic oligodendroglioma |
| RS_014 | 40-45 | RS/0.37 | Left frontal/insular lobe | 69.2 | Oligodendroglioma |
| RS_015 | 60-65 | NA/0.05 | Left frontal lobe | 34.7 | Mixed oligoastrocytoma |
| RS_016 | 55-60 | NA/0.01 | Left insula | 16.2 | Glioblastoma |
| RS_017 | 50-55 | R/0.08 | Left frontal lobe | 64.3 | Mixed oligoastrocytoma |
| RS_018 | 35-40 | R/0.35 | Left frontal lobe | 13.5 | Oligodendroglioma |
| RS_019 | 30-35 | R/0.25 | Right frontoparietal | 207 | Anaplastic oligodendroglioma |
| RS_020 | 50-55 | R/0.24 | Left temporal lobe | 19.9 | Glioblastoma |
| RS_021 | 25-30 | R/0.05 | Left frontal lobe | 63.3 | Mixed oligoastrocytoma |
| RS_022 | 65-70 | NA/0.02 | Right frontal lobe | 2.2 | Metastatic lung carcinoma |
| RS_023 | 50-55 | R/0.38 | Left parietal/splenium | 28.7 | Oligodendroglioma |
| RS_024 | 55-60 | R/0.25 | Left frontal lobe | 4.7 | Anaplastic oligoastrocytoma |
| RS_027 | 45-50 | L/0.48 | Left temporal lobe | 24.8 | Low-grade diffuse glioma |
| RS_029 | 50-55 | R/0.11 | Left frontal lobe | 14.5 | Oligodendroglioma |
| RS_030 | 70-75 | R/−0.14 | Right basal ganglia/thalamus | 16.6 | Glioblastoma |
| RS_031 | 50-55 | NA/0.53 | Left thalamus | 5.8 | Glioblastoma |
| RS_032 | 45-50 | R/0.79 | Right temporal lobe | 5.7 | Glioblastoma |
| RS_033 | 35-40 | R/0.64 | Left frontal lobe | 185 | Mixed oligoastrocytoma |
| RS_034 | 55-60 | NA/0.22 | Left temporal lobe | 24.9 | Meningioma |
| RS_035 | 25-30 | R/0.13 | Left temporal lobe | 10.1 | Oligoastrocytoma |
| RS_039 | 25-30 | L/0.18 | Right parietal lobe | 32.0 | Mixed oligoastrocytoma |
| RS_040 | 35-40 | R/0.29 | Right sylvian fissure | 31.5 | Ependymoma |
| RS_041 | 40-45 | NA/0.54 | Left frontal lobe | 23.3 | Mixed oligoastrocytoma |
| RS_042 | 60-65 | R/0.37 | Left parietal lobe | 0.7 | Glioblastoma |
| RS_043 | 30-35 | R/0.46 | Right temporal lobe | 4.0 | Low-grade glioneuronal tumor |
| RS_044 | 20-25 | R/0.40 | Left frontal lobe | 0.4 | Ganglioglioma |

TABLE 1-continued

Patient clinical and demographic data.

| Patient ID (N = 35) | Age (years) | Handedness Lat. index | Tumor location | Tumor size (mL) | Tumor pathology |
|---|---|---|---|---|---|
| RS_045 | 25-30 | L/0.33 | Bilateral frontal lobe (left-right) | 118 | Anaplastic astrocytoma |
| RS_047 | 55-60 | NA/0.16 | Left frontal lobe | 66..2 | Glioblastoma |

Clinical data for 35 patients with brain tumors (age 44.#z,899; 14.0 years: 12 female).

Patients were scanned with either a 3T Trio or Skyra scanner (Siemens, Erlangen, Germany) using a standard clinical presurgical tumor protocol. Anatomical imaging included T1-weighted (T1w) magnetization prepared rapid acquisition gradient echo (MP-RAGE), T2-weighted (T2w) fast spin echo, fluid-attenuated inversion recovery (FLAIR), susceptibility-weighted imaging (SWI), and pre/post-contrast T1w fast spin echo in three projections. Additional sequences for presurgical mapping included Diffusion Tensor imaging (DTI) for track tracing, T-fMRI for motor and language localization, and RS-fMRI.

Both the task and resting state fMRI were acquired using echo planar imaging (EPI) (voxel size 3×3×3 mm; TE=27 ms; TR=2.2 s; field of view=256 mm; flip angle=90°). The language T-fMRI employed a block design in which patients covertly generated words in response to a visually presented first letter. Five task/rest blocks (10 frames each) were acquired over a total of 90-100 frames (3:40 min total per T-fMRI run). For most subjects, two language task sessions were acquired, and the run with the lowest root-mean-square head motion measure was used in the present analysis. RS-fMRI was acquired in two 160-frame runs (total of 320 frames=11:44 min).

The fMRI data were preprocessed using previously described techniques using locally written software. Preprocessing was identical for RS-fMRI and for T-fMRI and included compensation for slice dependent time shifts, elimination of systemic odd-even slice intensity differences due to interleaved acquisition, and rigid body correction for head movement within and across runs. Atlas transformation was achieved by composition of affine transforms connecting the fMRI volumes with the T2-weighted and MPRAGE structural images, resulting in a volumetric time series in (3 mm cubic) atlas space. Additional preprocessing included: spatial smoothing (6 mm full width half maximum Gaussian blur in each direction), voxelwise removal of linear trends over each run, and temporal low pass filtering retaining-frequencies<0.1 Hz. Spurious variance was reduced by regression of nuisance waveforms derived from head motion correction and extraction of the time series from regions of white matter and CSF. The whole brain ("global") signal was included as a nuisance regressor. Frame censoring was performed to minimize the impact of head motion on the correlation results. Thus, frames (volumes) in which the root mean square (evaluated over the whole brain) change in voxel intensity relative to the previous frame exceeded 0.5% (relative to the whole brain mean) were excluded from the functional connectivity computations. All fMRI data acquired in each patient were pooled during preprocessing. Thus, the T-fMRI and RS-fMRI data were mutually co-registered in each patient. Additionally, all T-fMRI and RS-fMRI data in all patients were resampled in a standard atlas space. No attempt was made to correct for the mass effect of tumors. To match acquisition durations of RS-fMRI and T-fMRI (11:44 vs. 3:40 min), 100 contiguous frames were selected from pre-processed RS-fMRI data for comparisons with T-fMRI. Additionally, the full quantity of RS-fMRI data was compared to T-fMRI. T-fMRI responses were evaluated using standard general linear model methods. Activation maps were generated from the T-fMRI as described previously, smoothed with a 10 mm Gaussian filter, and masked to exclude extra-cranial voxels. Neither response clustering nor thresholding was done.

Normal human resting state fMRI data (N=2,795) were obtained from the Brain Genomics Superstruct Project (GSP) (Harvard University) and ongoing studies at Washington University in St. Louis including the Alzheimer's Disease Research Center (ADRC), the Dominantly Inherited Alzheimer's Network (DIAN), and studies by the Division of Infectious Diseases HIV Program (HIV) (Table 2). Statistical analysis of network FC (evaluated within and across the default mode network, the dorsal attention network, vision network, and deep gray structures) between the different data sets revealed no significant group effect attributable to study. Each subject had ~14 min of resting state fMRI data (TR=3,000 ins, 3 mm cubic) which was processed using standard methods. Resting state networks (RSNs) were identified using a set of 169 region of interests (ROI) divided into 11 RSNs. Multiple (n=268,000) example sets were generated from the data and then divided into a training (N=18,7600) and validation (N=80,400) sets. A 3D convolutional neural network (3DCNN) was trained to classify brain regions as belonging to a priori assigned RSNs. The 3DCNN consisted of 49 layers and 3 dense blocks that performed 3 and 5 cubic convolutions. Batch normalization was used within the network to prevent overfitting and improve performance, and average pooling was used for dimensionality reduction. Training was terminated if the accuracy did not improve after 3 validations. The 3DCNN was implemented in Matlab R2019b using standard deep learning functions and architectures. Additional details about convolutional networks may be found in, for example, Huang G, Liu Z, Van Der Maaten L, et al. Densely connected convolutional networks. In: Proceedings—30th IEEE Conference on Computer Vision and Pattern Recognition, CVPR 2017.; 2017, the disclosure of which is hereby incorporated herein by reference in its entirety.

For each of 35 tumor patients the T-fMRI results were compared to the 3DCNN results obtained with matched data samples, i.e., 100 contiguous frames of RS-fMRI. Additionally, the 3DCNN analysis was run using all available data (320 RS-fMRI frames per subject). 3DCNN maps representing the probability of language representation were smoothed with stride-1 mode filtering and length-3 box filtering.

TABLE 2

Studies used to obtain normal training data.

| | GSP | ADRC | DIAN | HIV |
|---|---|---|---|---|
| N | 1,137 | 1,289 | 336 | 775 |
| Age (std) | 21.4 (2.4) | 68.1 (7.9) | 40.9 (10.9) | 44.3 (16.3) |
| Scanner | Trio | Trio/Biograph | Trio/Verio | Trio/Prisma |
| Voxel Size in cubic mm | 3.0 | 4.0 | 3.3 | 4.0 |
| Flip angle in degrees | 85 | 90 | 80 | 90 |
| Repetition time (TR) in ms | 3,000 | 2,200 | 3,000 | 2,200 |
| Total number of fMRI frames | 248 | 328 | 140 | 328 |

Refer to text for acronyms and citations.

Figure 3:
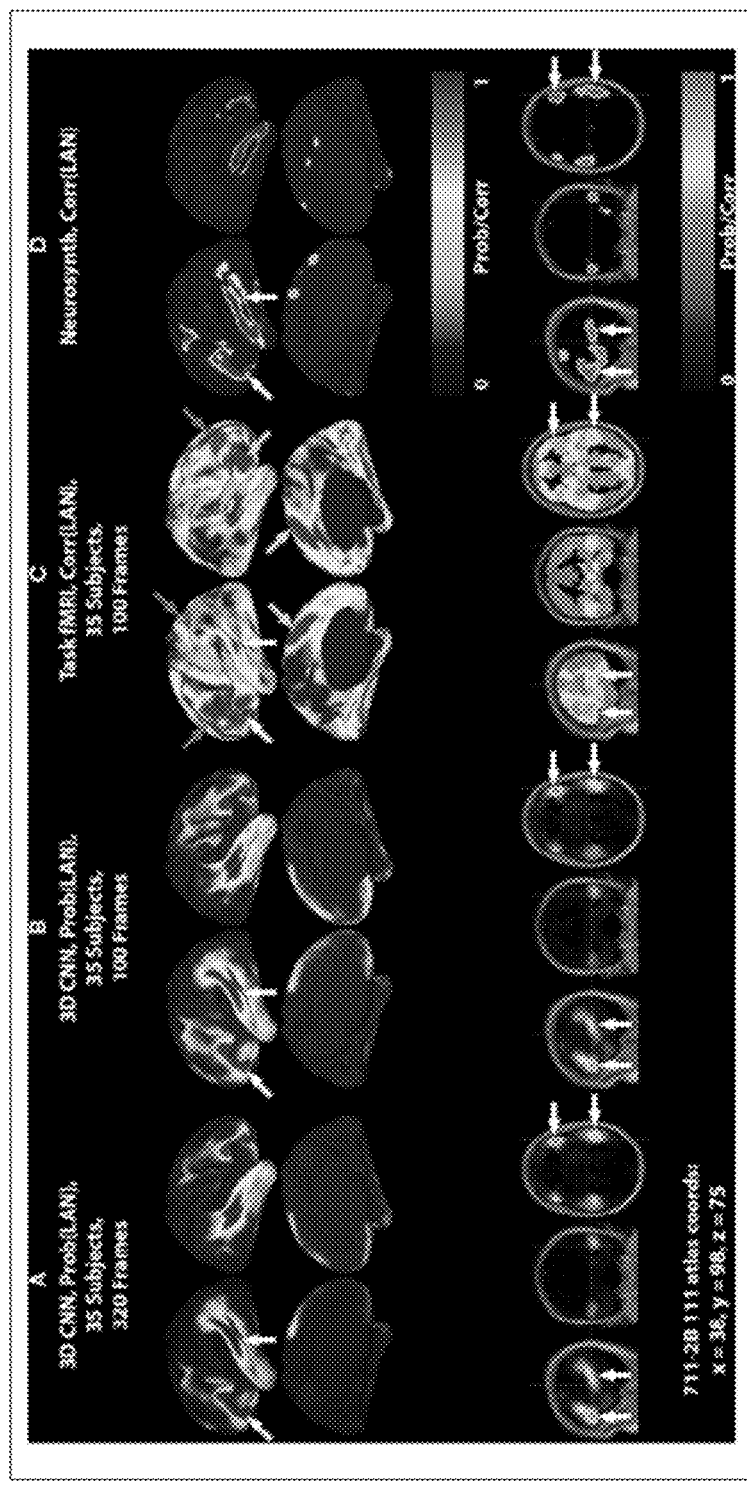
FIG. 3 depicts 3DCNN maps and T-fMRI responses focusing on language localization.

FIG. 3 depicts 3DCNN maps and T-fMRI responses focusing on language localization. All RS-fMRI and T-fMRI results are averages over 35 patients. Surface plots show probabilities thresholded at p>0.02. Top row shows lateral surface plots; middle row shows medial surfaces; bottom row shows sagittal, coronal, and axial views at coordinate x=38, y=98, z=75 on the 711-2B atlas using radiologic conventions (left body on right image). Columns show: (A) 3DCNN language (LAN) map computed using 320 frames per patient (all available RS-fMRI data). (B) 3DCNN LAN map computed with only 100 frames per patient. (C) Word stem completion T-fMRI responses. (D) Neurosynth map derived with the search term, "language comprehension." White arrows indicatethe areas of Broca and Wernicke. Pink arrows indicate task responses in the right anterior insula and dorsal anterior cingulate cortex (core task-control regions). Red arrows indicate task responses in anterolateral prefrontal cortex and superior parietal lobule (dorsal attention and fronto-parietal control networks).

Language representation in the brain resides primarily on two areas of the left cerebral cortex: Broca's area, located in inferior frontal cortex (roughly, Brodmann areas 44 and 45) and frontal operculum, is required for fluid performance of phonemic or semantic tasks. Wernicke's area extends over portions of temporal and parietal cortex and is essential for understanding written or spoken language. The Broca-Wernicke model embodies core expressive and receptive language functions but omits auxiliary functions such as reading.

The ground truth was defined for language representation using T-fMRI responses aggregated by Neurosynth. This representation was confined to the left hemisphere to simplify comparison between the Neurosynth regions and those derived in our patients. To define T-fMRI-based language ROIs, Neurosynth was using "language comprehension" as a search term, which identified 107 studies (as of November 2018) contributing coordinates in Talairach atlas space, each coordinate associated with a Z-score corresponding tothe null hypothesis of equally likely activation anywhere in the brain. The returned association map (threshold at Z>3.7 by Neurosynth) was passed through smoothing and clustering operations (see below), ultimately yielding Broca- and Wernicke-like ROIs in volumetric atlas space.

The following steps were taken to obtain Broca- and Wernicke-like ROIs starting with a "language comprehension" map (units=Z-score) generated by Neurosynth in 2 cubic mm MNI152 atlas space:
1. Gaussian smooth using a kernel of 1 mm full width at half maximum (FWHM) in each cardinal direction.
2. Transform Z-scores>0 to probability maps using the hyperbolic tangent and threshold at Z-score>3.7.
3. Retain two largest clusters to generate initial estimates of Broca and Wernicke regions in the left hemisphere.
4. Gaussian smooth using a 3 mm FWHM isotropic kernel in each cardinal direction.
5. Resolve overlapping clusters into two disjoint ROIs by assigning multiply labeled voxels to the ROI with the nearest center of mass.

fMRI preprocessing, denoising, and computation of RS-fMRI and T-fMRI responses were done using the 4dfp software library. MATLAB R2019b was used for statistical computations and visualization. Connectome Workbench, version 1.2.3, was used to map volumetric data onto the PALS-B12 mid-thickness surfaces and rendered on the corresponding inflated surface.

RS-fMRI and T-fMRI produce native measurements with distinct statistical properties. Acceptable conventions for image processing, denoising, and significance testing have evolved distinctly for these functional imaging methods. Additionally, highly non-linear deep learning architectures such as 3DCNNs have unknown statistical properties when applied to functional imaging data. To enable meaningful statistical comparisons in our data, probabilistic strategies were used to enhance the detection of the population-invariant language network and reduce the influence of experimental conventions, differential preprocessing and the biological variability arising from the use of normal training data but pathophysiologic testing data. Specifically, common image processing pipelines were reused wherever possible in our analyses. All method-specific metrics were reduced to normalized probability maps. For purposes of group-level inferences, for each patient, all temporal imaging information was contracted into T-fMRI activations or RS-fMRI membership in RSNs. As described in the preprocessing methods, all T-fMRI and RS-fMRI data were co-registered to a standardized atlas. Consequently, spatially distributed measures of task activation or resting state network membership retained co-registration in atlas space. Arithmetic averages of patient data were used prior to computing comparative analyses at the group-level. Finally, method-dependent thresholds were used for detection of language networks by analysis of receiver operating characteristics (ROC). ROC computations made exclusive use of the perfcurve method from Matlab. Significance testing at alpha=0.05 included computation of point-wise confidence intervals on true positive rates by vertical averaging over 101 false positive rate intervals and resampling with 10,000 bootstrap iterations. All other parameterizations of perfcurve were default values.

FIGS. 3A-3D (collectively FIG. 3) show group level localizations of the language network. FIGS. 3A and 3B are computed from 3DCNN analysis of RS-fMRI, using the full amount of available resting state data (3A), and one third of the available data (3B), comparable to the amount of data available in the T-fMRI. FIG. 3C is a group level language map computed from the T-fMRI response to word-stem completion. FIG. 3D is derived from the Neurosynth platform using the search term "language comprehension." Both T-fMRI and RS-fMRI clearly identify Broca and Wernicke regions. The 3DCNN method provides highly specific maps with large probability gradients at the margin of the language regions, as would be expected of a method trained on thousands of exemplars including millions of internal parameters. The T-fMRI experiment focused on expressive language and therefore emphasizes Broca's region. The 3DCNN map reflects the properties of spontaneous activity which characteristically is more symmetric than task responses. Robust delineation of both Broca's and Wernicke's area is not surprising as the 3DCNN was trained to recover the topography of T-fMRI responses in RS-fMRI data.

FIGS. 4A-4D (collectively FIG. 4) depict (A) 3DCNN map of the CON. (B) 3DCNN map of the FPN. (C) 3DCNN map of the DAN. (D) T-fMRI responses (reproduced from FIG. 3C). Pink arrows point to components of the cingulo-opercular network (CON). Red arrows point to components of the dorsal attention network (DAN) and fronto-parietal control network (FPC). See text for discussion of these task-general functional systems.

Figure 4:
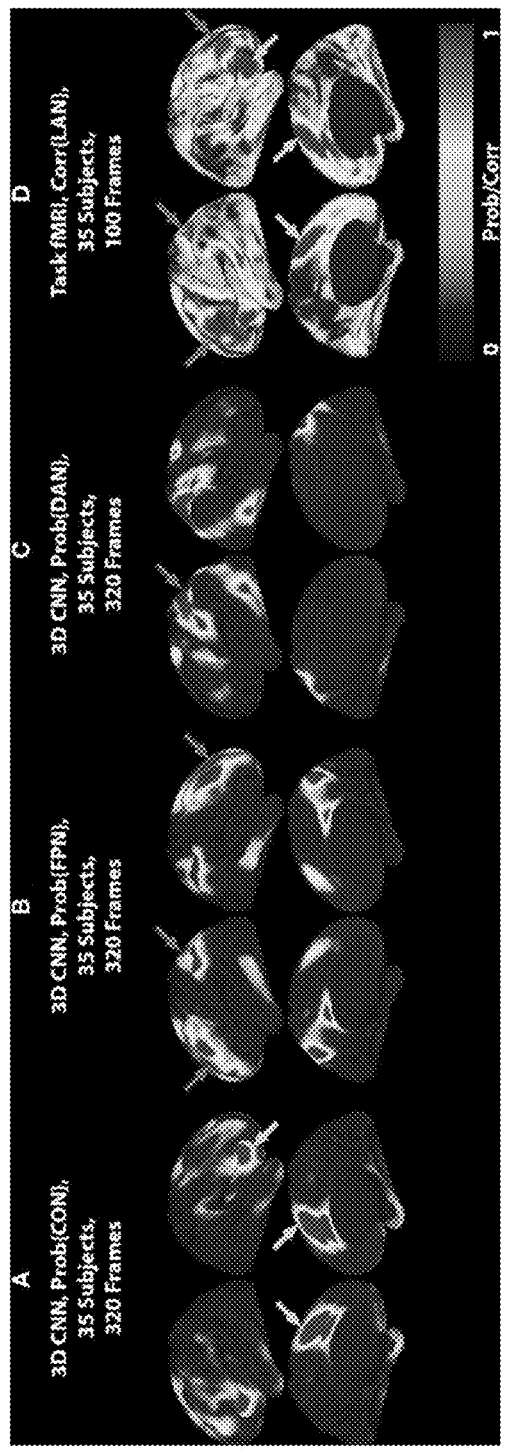
FIG. 4 depicts 3DCNN maps of the CON, FPN, and DAN and T-fMRI responses.

The crucial difference between the two methods is that the word stem completion task activates areas not specifically associated with language (pink and red arrows in FIGS. 3-4) in addition to areas that are specifically associated with language (pink arrows in FIGS. 3-4). Task-general responses occur in the cingulo-opercular network, the dorsal attention system, and fronto-parietal control network. Additional discussion of these task-general systems is given below.

Figure 5:
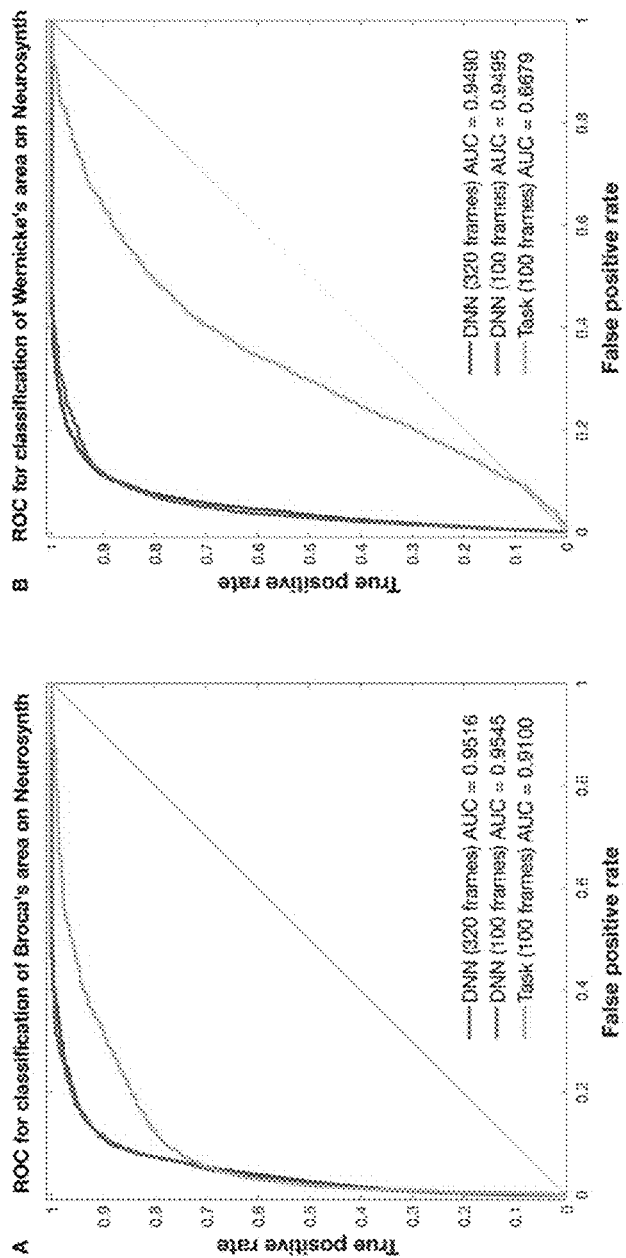
FIG. 5 depicts ROC curves for mapping the language network.

FIGS. 5A and 5B (collectively FIG. 5) depict ROC curves for mapping the language network. Curves are from 3DCNN using 320 (blue) or 100 (red) resting-state fMRI frames. Additional curves are from 100 (yellow) T-fMRI frames. Ground truth labels are binary classes derived from thresholded Neurosynth data. All curves were constructed after averaging over 35 brain tumor patients. (A) Broca's area and (B) Wernicke's area are assessed separately.

The topography of T-fMRI and RS-fMRI maps was assessed in relation to language ROIs defined on the basis of aggregated fMRI responses to language tasks (FIG. 3D). ROC curves for Broca's area and Wernicke's area in FIG. 5.

In Broca's area, the 3DCNN AUC exceeded that for T-fMRI for both lengths of data, full length AUC=0.9516 [0.9469, 0.9556] vs. 0.9100 [0.8992 0.9196] and for 100 frame data AUC=0.9545 [0.9502, 0.9587] vs. 0.9100 [0.8992, 0.9196]. Notably, the AUC between the 3DCNN full length data and that for the shortened 100 frame data had overlapping 95% confidence intervals.

In Wernicke's area, the differences between the 3DCNN AUC and that of the T-fMRI was much larger, full length AUC=0.9490 [0.9450, 0.9527] vs. 0.6679 [0.6549, 0.6811] and for 100 frame data AUC=0.9495 [0.9449, 0.9537] vs. 0.6679 [0.6549, 0.6811]. As in the Broca's case, the AUC between the 3DCNN full length data and that for the shortened 100 frame data had overlapping 95% confidence intervals.

This section demonstrates two case examples of the ability of the 3DCNN method to provide data acquired in individual patients and a comparison between the 3DCNN method and the T-fMRI at the individual level. Individual cases took approximately 4 h of computation time on a Dell (Austin, Texas) Power Edge 18 core with Nvidia (Santa Clara, California) v100 GPU.

Figure 6:
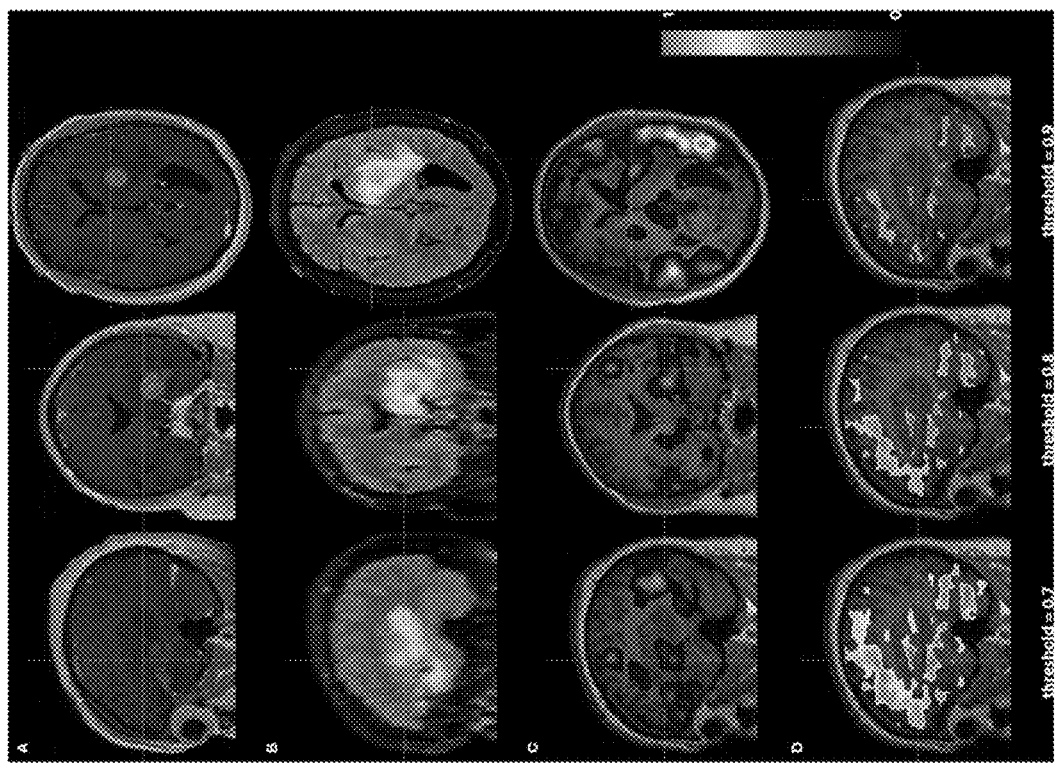
FIG. 6 depicts exemplar patient RS003 with glioblastoma multiforme in the left basal ganglia region.

FIG. 6 depicts exemplar patient RS003 with glioblastoma multiforme in the left basal ganglia region. (A) Contrast-enhanced T1 and (B) fluid-attenuated inversion recovery demonstrating the tumor and surrounding edema. (C) Probability map of language network from 3DCNN with significant overlap of the tumor and (D) probability map of language from the T-fMRI also showing overlap over the tumor. Deep learning results show probabilities>0.02. Task fMRI thresholds are varied in accordance with clinical practice.

Case 1. Images from a 44 year old right handed male (RS003) with glioblastoma multiform in the left basal ganglia region are presented in FIG. 6. The top two rows display the anatomy with a post contrast T1-weighted and FLAIR images. The bottom two rows display the language localization information from the 3DCNN and T-fMRI overlying the anatomical images. The T-fMRI is provided at several thresholds in accordance with clinical practice. Although the T-fMRI appears noisier (bottom row) than the 3DCNN (third row), the information provided by both methods is similar with significant overlap of the localized language area with the tumor location.

Figure 7:
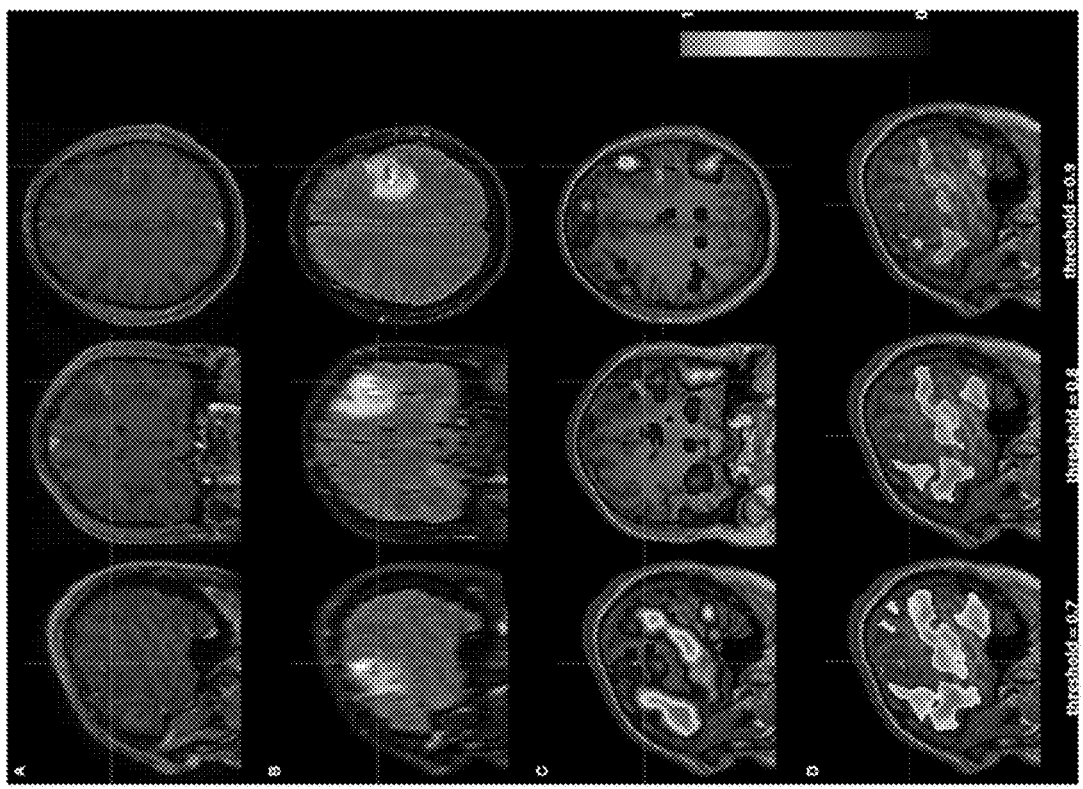
FIG. 7 depicts exemplar patient RS004 with high grade glioma with anaplastic features in the subcortical left frontal lobe.

FIG. 7 depicts exemplar patient RS004 with high grade glioma with anaplastic features in the subcortical left frontal lobe. (A) Contrast-enhanced T1 and (B) fluid-attenuated inversion recovery demonstrating the tumor and surrounding edema. (C) Probability map of language network from 3DCNN with mild overlap of the tumor and (D) probability map of language from the T-fMRI also showing mild overlap over the tumor. Deep learning results show probabilities>0.02. Task fMRI thresholds are varied in accordance with clinical practice.

Case 2. Images from a 24 years old right handed male (RS004) with anaplastic glioma in the subcortical left frontal lobe are presented in FIG. 5. As in Case 1, The top two rows display the anatomy with a post contrast T1-weighted and FLAIR images. The bottom two rows display the language localization information from the 3DCNN and T-fMRI overlying the anatomical images. In this case, the sagittal views of the two methods are very similar, although the 3DCNN (third row) demonstrates more overlap of the language localization with the tumor as compared to the T-fMRI (bottom row).

The current work demonstrates that the representation of language in the brain can be identified using 3DCNN analysis of RS-fMRI data (FIG. 3, white arrows). It should be noted that the 3DCNN was trained to identify language-associated parts of the brain using T-fMRI acquired at Washington University School of Medicine [same training set used previously]. The Neurosynth-derived map was obtained from an independent meta-analysis of reported neuroimaging studies. Nevertheless, the 3DCNN and Neurosynth maps are strikingly similar.

The differences between T-fMRI and 3DCNN maps are instructive. The word-stem completion task activated the dorsal anterior cingulate (dACC) (a.k.a the rostral cingulate zone) as well as the right anterior insula (FIGS. 3-4, pink arrows). These regions are components of the salience network, also known as core task-control regions. The core task control system is recruited by a wide variety of goal-directed behaviors. Functions attributed to the dACC include task control, error monitoring, and conflict detection. Additional T-fMRI responses not specific to the LAN occurred in the left superior parietal lobule and the left middle frontal gyrus. These regions are components of the dorsal attention network (DAN) and the fronto-parietal control network (FPC) (FIGS. 3-4, red arrows). The DAN responds to any task requiring directed spatial attention. The FPC supports goal-directed analysis of environmental stimuli. These functional systems are recruited by the word stem completion task as it requires directing attention to and analyzing stimuli presented on an electronic display.

The present results raise the possibility of distinguishing between parts of the brain that are language specific vs. task-general. This distinction may be of value in selected neurosurgical cases. Although the DAN and dACC are not conventionally classified as "eloquent", injury to these areas can lead to attentional deficits and to loss of motivated behaviors, respectively.

An additional important observation evident in FIG. 3 is that the localization of the language network using the 3DCNN appears remarkably tolerant to limited quantities of RS-fRMI data. This characteristic could lead to reduced RS-fMRI acquisition times.

FIG. 5 compares T-fMRI vs. 3DCNN as regards localization of Broca and Wernicke areas as defined a priori, according to a large collection of T-fMRI studies aggregated by Neurosynth. According to the AUC measure, 3DCNN had a small but significant advantage over T-fMRI in localizing Broca's area (FIG. 5A). The difference was much larger in Wernicke's area (FIG. 5B). This result is understandable as the word stem completion task is an expressive language task that preferentially activates Broca's area. Performing several different T-fMRI studies better characterizes the language system. FIG. 5 also demonstrates 3DCNN tolerance to a limited quantity of data: there is no significant difference in AUC corresponding to 100 vs. 320 frames (red and blue curves).

The case examples demonstrate 3DCNN functional mapping in individual patients with brain tumors (FIGS. 6 and 7). The higher specificity and sharper margins of the 3DCNN method in comparison to T-fRMI is promising. A prospective comparison of the 3DCNN RS-fRMI method vs. T-fMRI remains to be done.

Thus, it is demonstrated that 3DCNN analysis of RS-fMRI data is able to accurately and specifically localize the language network in patients with brain tumors. In addition to the inherent advantages of RS-fMRI, specifically, limited requirement for patient cooperation, the 3DCNN method provides robust results with limited quantities of data, which is an advantage in the clinical setting. This method may therefore lead to improved pre-surgical localization in future applications.

Further examples of application of the system 100 to detection and mapping of resting state neural networks will be described below.

Normal human resting state fMRI data (N=2010) were obtained from the Brain Genomics Superstruct Project (GSP) and ongoing studies at Washington University in St. Louis, including healthy control data from the Alzheimer's Disease Research Center and HIV studies. All participants were deemed cognitively normal based on cognitive testing performed in each of the given studies. The appropriate Institutional Review Boards approved all studies, and all participants provided written informed consent.

All neuroimaging was performed on a 3T Siemens scanner (Siemens AG, Erlangen, Germany) equipped with the standard 12-channel head coil. A high-resolution, 3-dimensional, sagittal, T1-weighted, magnetization-prepared rapid gradient echo scan (MPRAGE) was acquired (echo time [TE]=16 milliseconds, repetition time [TR]=2,400 milliseconds, inversion time=1,000 milliseconds, flip angle=8°, 256×256 acquisition matrix, 1 mm3 voxels). RS-fMRI scans were collected using a gradient spin-echo sequence (voxel size=3-4 mm3, TR=2200-3000 ms, FA=80°-90°) sensitive to BOLD contrast (see Table 3 for details). Statistical analysis of network FC (evaluated within the default mode network and dorsal attention network) between the different data sets revealed no significant group effect due to the different studies (see Table 3). Each subject had approximately 7-14 minutes of resting state fMRI data which was processed using standard methods developed at WUSM.

TABLE 3

Characteristics of MRI acquisition by study.

| Scanner | GSP Trio | ADRC Trio/Biograph | HIV Trio/Prisma |
|---|---|---|---|
| Voxel Size cubic mm | 3.0 | 4.0 | 4.0 |
| Flip angle in degrees | 85 | 90 | 90 |
| Repetition time (TR) ms | 3000 | 2200 | 2200 |
| Number frames | 250 | 328 | 328 |

Structural data preprocessing was performed with FreeSurfer (http://surfer.nmr.mgh.harvard.edu). Visual inspection of the automated segmentation results was performed for quality assurance purposes and corrections were made when necessary. RS-fMRI Preprocessing methods were performed as previously described. Head motion was corrected using affine transformations, and additional in-house methods were used to identify subjects with excessive movement for exclusion. Data also underwent whole brain signal regression, ventricular (CSF) and white matter signal regression, movement time-series regression, and low-pass temporal filtering to remove frequencies below 0.08 Hz. The structural MPRAGE and preprocessed RS-fMRI scans were cross-aligned using boundary-based registration. RS-fMRI scans were then transformed to common coordinates using a single non-linear interpolation. A 4-mm full-width half-maximum smoothing kernel was used in the surface space.

300 predefined seed regions of interest (ROIs) were used to assign voxels to one of 15 RSNs for generation of training data. The networks include dorsal somatomotor (SMD), ventral somatomotor (SMI), cinguloopercular (CON), auditory (AUD), default mode (DMN), parietal memory (PMN), visual (VIS), frontoparietal (FPN), salience (SAL), ventral attention (VAN), dorsal attention (DAN), medial temporal (MET), reward (REW), basal ganglia (BGN), and thalamus (THA). Random subsampling of ROIs within a given predefined network was used to extract a 3D similarity map by computing the Pearson's product moment correlation between the mean of the subsampled BOLD signals and every other voxel in the brain. The 3D similarity map was then assigned to one of the 15 networks based on the highest correlation between the mean subsampled signal and the mean signal for each network, and the assigned network labes were used for classification when training the 3DCNN. This process was applied in numerous iterations for each network and for each participant.

Figure 8:
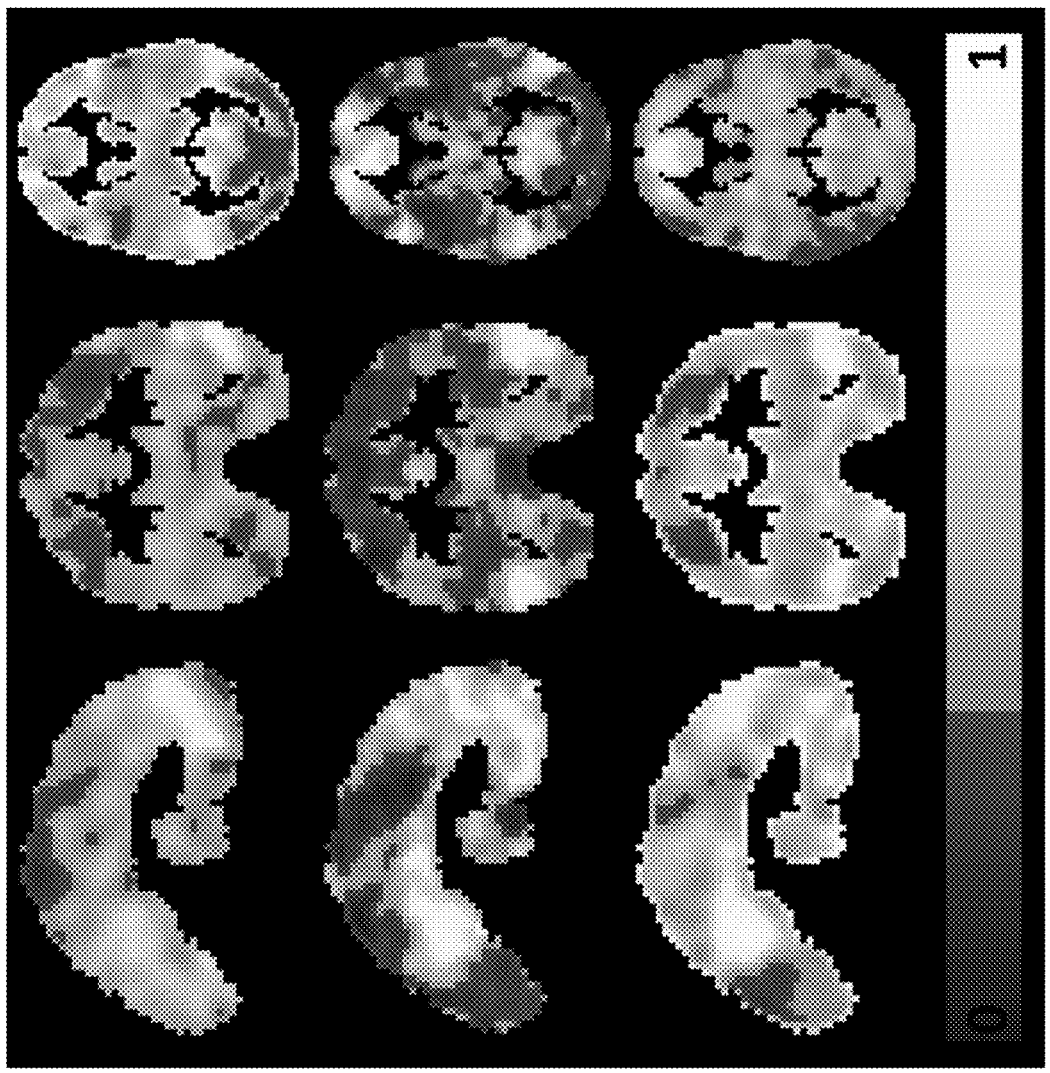
FIG. 8 shows examples of 3D similarity maps of the DMN used for training.

FIG. 8 shows examples of 3D similarity maps of the DMN used for training. A total of 1,313,140 training instances were generated across all networks. Further, within each class 20% of the training instances were augmented by a combination of 3d random affine transformations (rotations (±5 degrees), translations (±3 pixels)), scaling (between 0.9-1.1), sheering (±3 degrees), and adding gaussian noise. Application of data augmentation has been shown in numerous studies to improve out of sample testing and prevent overfitting. Two hundred BOLD scans from our training data set were reserved for generating validation data for the 3DCNN, and validation samples were generated in the same manner as above. Approximately 200,000 validation samples were generated from the held out scans.

After training, model outputs were compared using data from the midnight scan club (MSC) collected at WUSTL. The MSC contains data collected on 10 participants each scanned 10 subsequent days including 30 minutes of RS-fMRI. This data is openly available and has been well characterized in numerous studies. MSC data was used to evaluate model results when compared to Neurosynth task-based maps, evaluate model performance when reducing the total number of BOLD time points, and evaluate model performance after noise was injected into the BOLD signal. Noise injection was performed by adding the scaled BOLD signal to a scaled pink noise signal. For example, to achieve 10% noise injection, the bold signal was rescaled to a [−0.9 0.9] interval, the noise signal was scaled to a [−0.1 0.1] interval, and the signals were added together. A new noise signal was generated for each voxel: Similarity between results was measured using the multiscale structural similarity index.

The Neurosynth platform was utilized to generate statistical maps of z-scores for $\chi^2$ tests of significance on terms mapped to task activation coordinates. In short, the Neurosynth software platform provides automations for parsing texts of published T-fMRI studies to generate aggregated task activation data into statistical maps of significance. Neurosynth's term frequency-inverse document frequency (tf-idf) scheme was used to map terms to task activations. Term frequency is the number of occurrences of a query term per document, evaluated over all documents. Inverse document frequency is log(N/df) for N documents and df defined to be the number of documents containing a query term. Neurosynth directly maps tf-idf scores to task activations using activation coordinates parsed from documents. Terms mapped to task activations were mapped to correlation coefficients using the hyperbolic tangent of z-scores. The list of terms used in our analysis include "attention" (corresponding to DAN), "auditory", "default mode", "language" (corresponding to VAN), "motor" (corresponding to SMD), "reward", and "visual".

An artificial neural network receives 3D scan data as an input and analyzes the spatial relationship between voxels and how adjacent voxels are related. The artificial neural network may be a convolutional neural network, long short term memory network (LSTM), feed forward nets, recurrent nets, or any other acceptable method of machine learning. The artificial neural network is trained to receives the 3D dataset and calculates the probability that a voxel belongs to a resting state network. In this example, a 3DCNN is used which can accept a 3D dataset, however, some machine learning methods (e.g. MLP) cannot accept 3D inputs and require that scan data be reduced to 2D or 1D.

A 3D convolutional neural network (3DCNN) with 73 layers was trained to classify each voxel of gray matter as belonging to a given RSN. The 3DCNN had a densely connected architecture, with residual layers nested within each of the 3 dense blocks. Within the network, 3 and 7 cubic convolutions were performed. The final output, as well as the output from each dense block was directly connected to the cross entropy layer after global average pooling and 20% dropout, which has been shown to prevent overfitting through structural regularization, is more robust to spatial translations of the input, and requires less learnable parameters. Batch normalization, which helps to prevent overfitting and speed up training, was used prior to convolutional operations within the network. Leaky rectified linear units, which can cause the network to train faster and alleviate the "dying ReLu" problem of traditional Relu layers, were used after convolutions. Both max and average pooling were used between dense blocks for dimensionality reduction. Combining max and average pooling has been shown in some studies to outperform a single technique. Each pooling layer was 2×2×2 with a stride of 2. Because the number of samples from each class (network) were not even, the 3DCNN used a cross entropy loss function with weighted classification such that each class contributed equally to the loss function. Training was terminated if the accuracy did not improve after 3 validations. The 3DCNN was implemented in Matlab R2019b.

A majority of the cohort were Caucasian (69%) females (59%), with an average age of 44.6±23.5 years and 14.8±2.2 years of education. Detailed demographics are shown in Table 4.

TABLE 4

|  | Total | HIV | ADRC | GSP |
| --- | --- | --- | --- | --- |
| Number of participants | 2010 | 206 | 665 | 1139 |
| Mean and STD of age | 44.6 ± 23.5 | 37.9 ± 17.1 | 67.6 ± 7.8 | 21.3 ± 2.7 |
| % Female | 59% | 52% | 60% | 59% |
| Mean and STD for education | 14.8 ± 2.2 | 13.9 ± 2.1 | 15.9 ± 2.6 | 14.3 ± 1.9 |
| % Caucasian | 69% | 44% | 86% | 65% |

Figure 9:
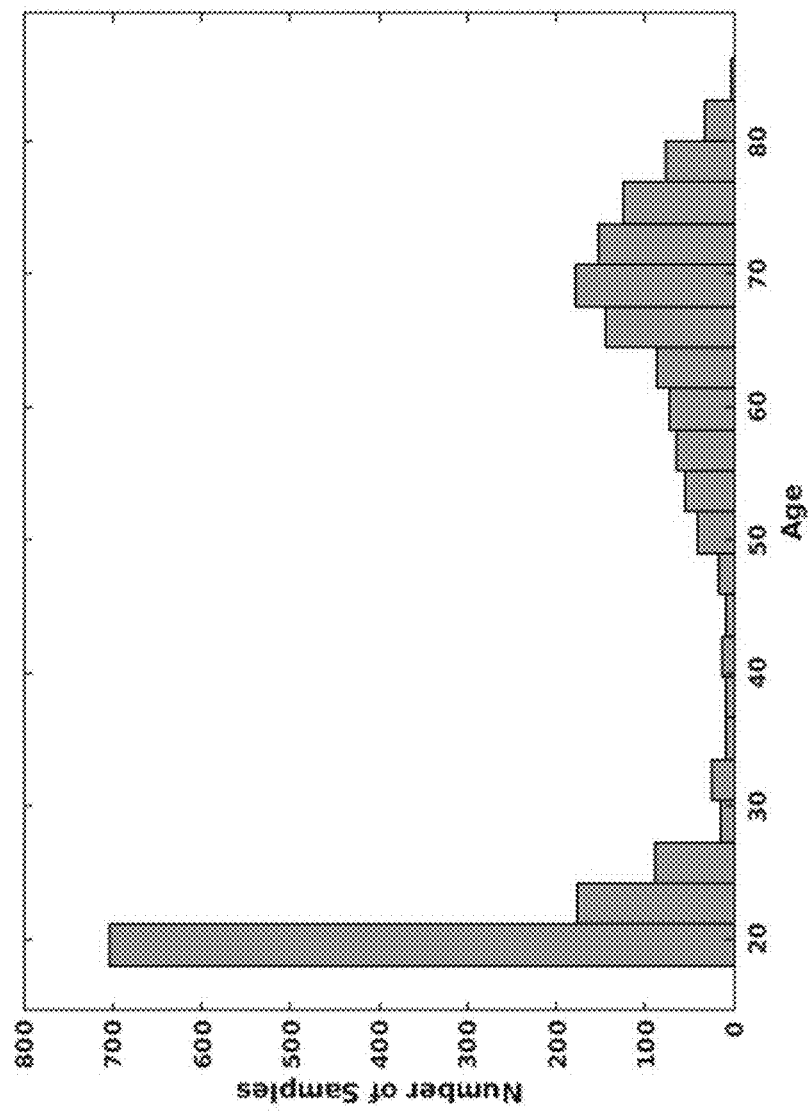
FIG. 9 shows the age distribution of the data used for training.

FIG. 9 shows the age distribution of the data used for training.

Figure 10:
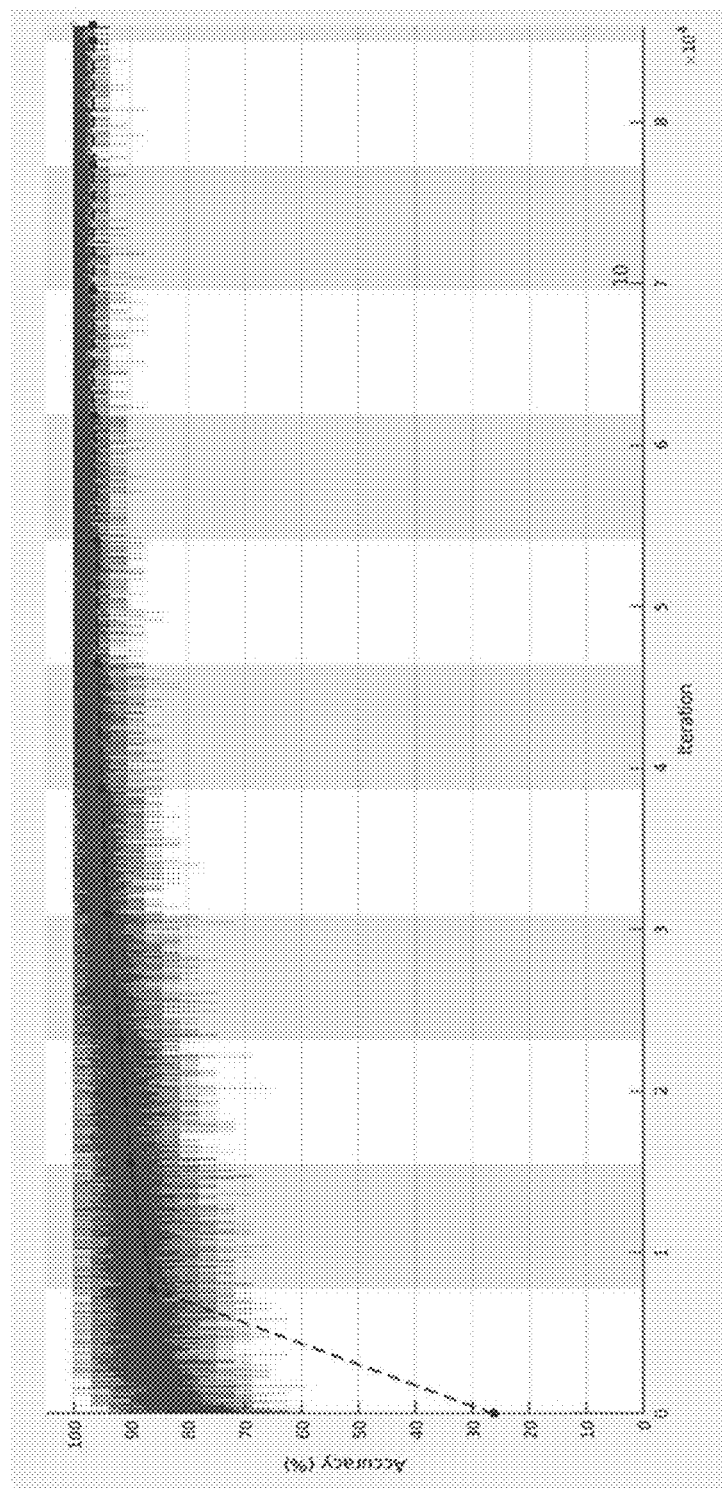
FIG. 10 shows training and validation results for the 3DCNN. The model achieved 99% accuracy on training data and 97% accuracy on out of sample validation data after 8 epochs.

FIG. 10 shows training and validation results for the 3DCNN. The model achieved 99% accuracy on training data and 97% accuracy on out of sample validation data after 8 epochs.

Figure 11:
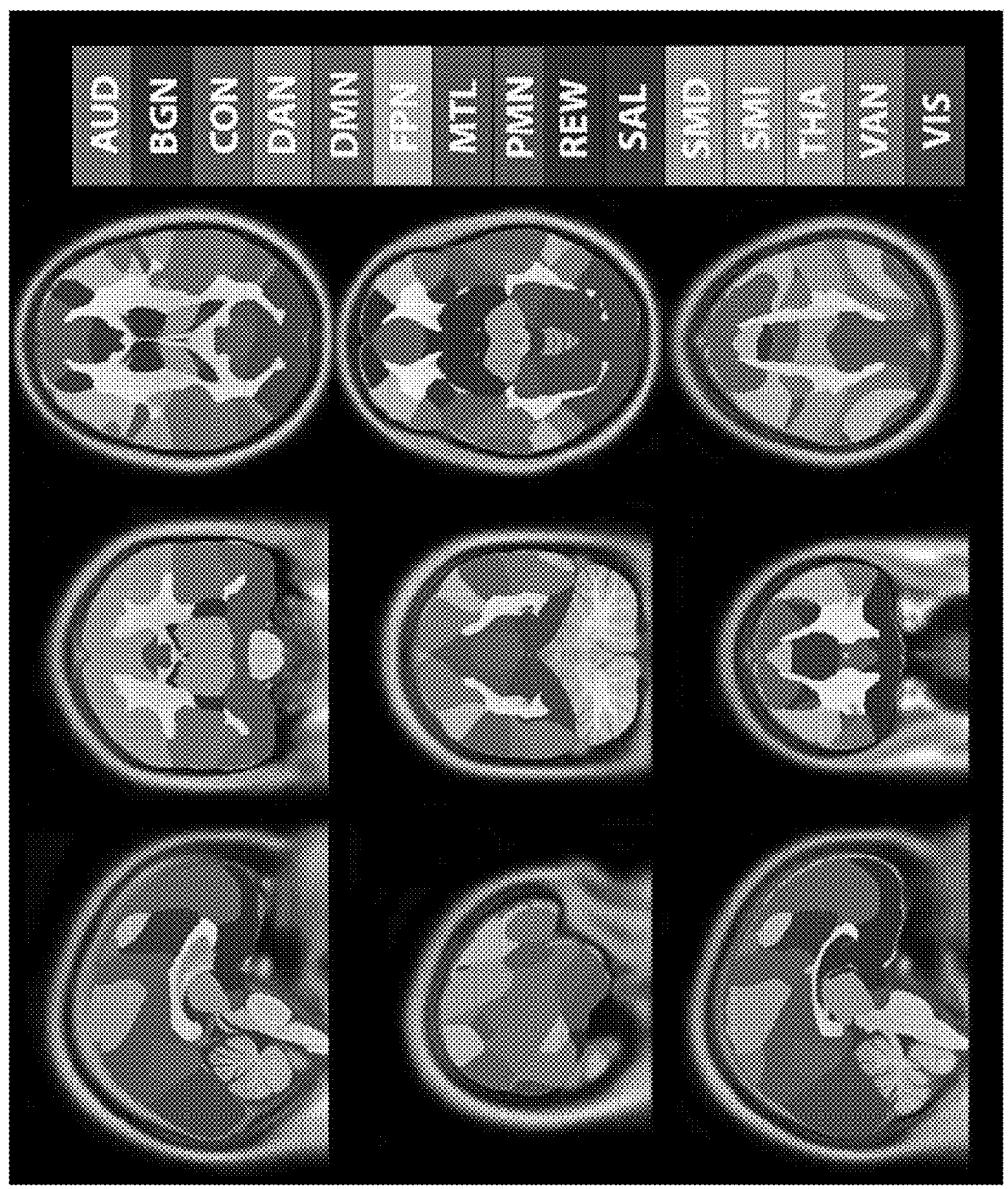
FIG. 11 shows the RSN segmentation based on the maximum probability produced by the 3DCNN averaged across all 2010 participants.

FIG. 11 shows the RSN segmentation based on the maximum probability produced by the 3DCNN averaged across all 2010 participants.

FIG. 12A shows the mean probability values averaged over each RSN based on the maximum probability mask shown in FIG. 11. The highest average probabilities were observed in VIS, SMD, THA, and BGN. Similarly, FIG. 12B shows the average geometric mean by RSN. The greatest values were observed in VAN, CON, and REW, and again the smallest values observed in BGN and THA. FIG. 12C shows the average values for the mean scaled by the standard deviation. The BGN, SMD, SMI, and THA showed the greatest probabilities. FIG. 12D shows the total area for each network, with VIS, DMN, and FPN covering the greatest area.

Figure 12:
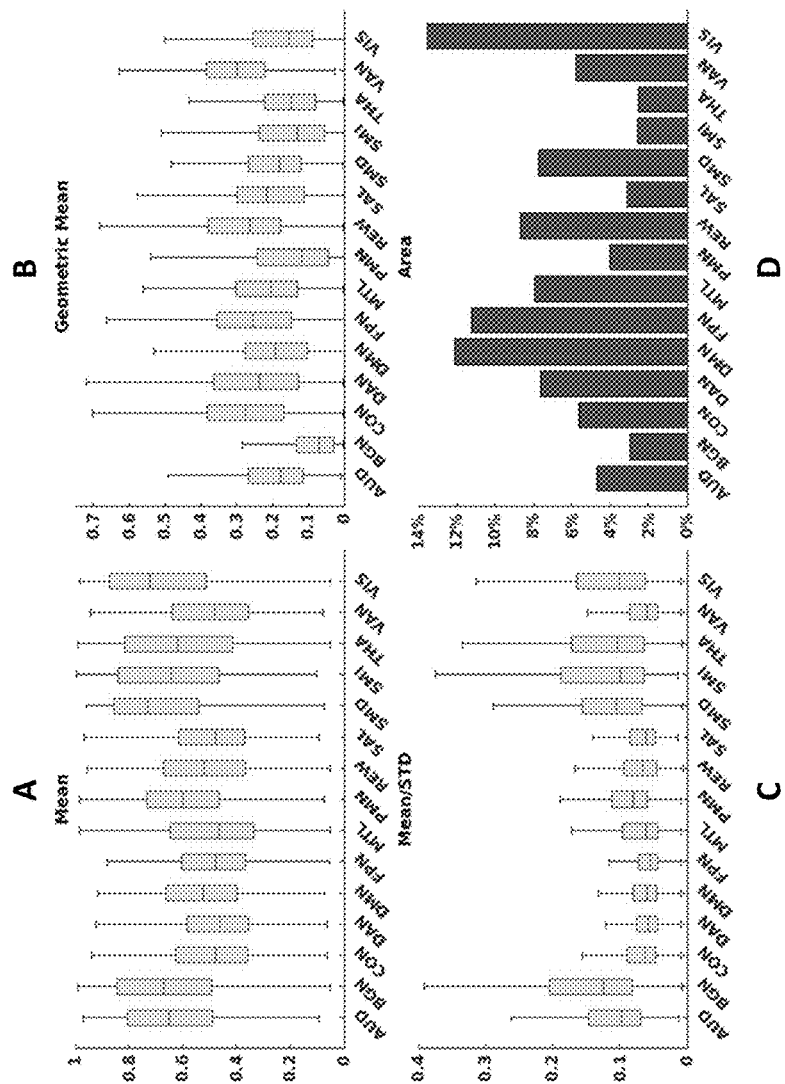
FIG. 12A shows the mean probability values averaged over each RSN based on the maximum probability mask shown in FIG. 11.
FIG. 12B shows the average geometric mean by RSN.
FIG. 12C shows the average values for the mean scaled by the standard deviation.
FIG. 12D shows the total area for each network, with VIS, DMN, and FPN covering the greatest area.
Figure 13:
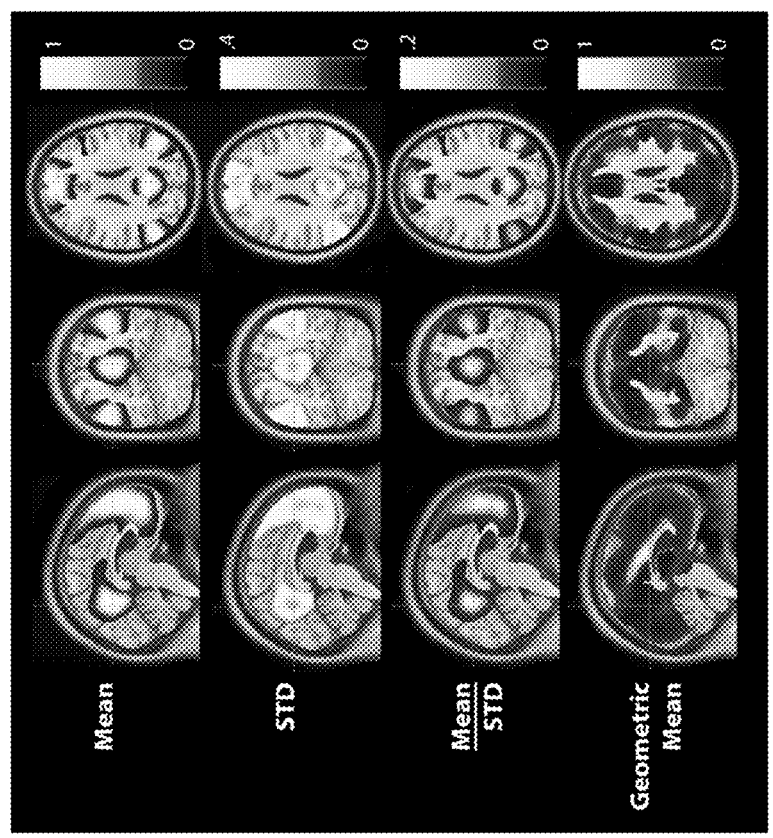
FIG. 13 visualizes the metrics shown in FIG. 12 for the DMN.

FIG. 13 visualizes the metrics shown in FIG. 12 for the DMN.

Figure 14:
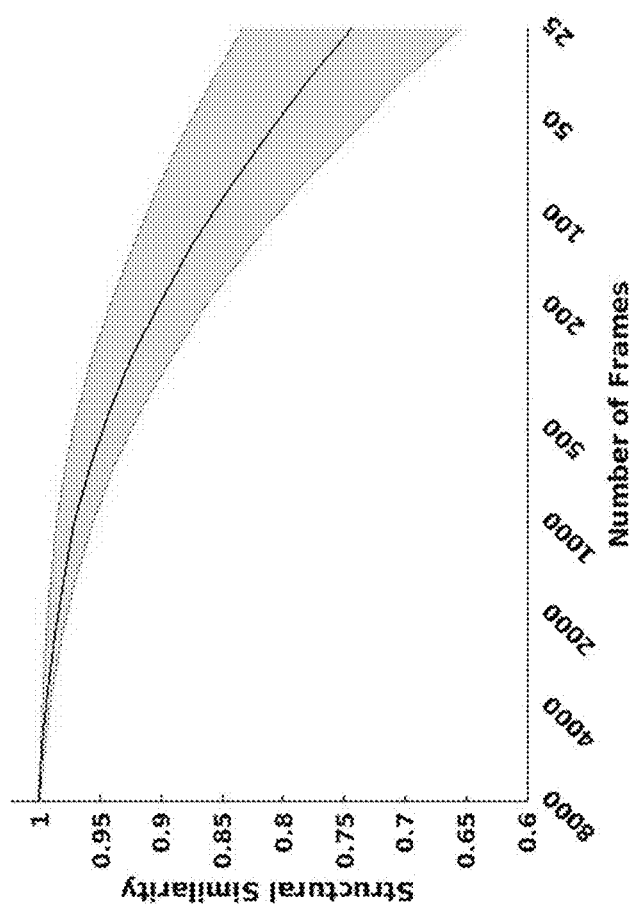
FIG. 14 shows the result of reducing the total number of BOLD time points averaged over the MSC data.

The model was further evaluated for stability of results based on number of BOLD time points and signal noise. FIG. 14 shows the result of reducing the total number of BOLD time points averaged over the MSC data. On average, the model maintained a 0.9 structural similarity when comparing 8000 time points to ~150 time points. While this shows that results are reliable with limited data, better results may be achieved than other methods by using larger sets of data. Different applications may require different quantities of RS-fMRI 3D image frames. For example, pre-surgical planning in patients with brain tumors or epilepsy may require more than 1000 images, however, studies for Alzheimer's may require as few as 250 images.

Figure 15:
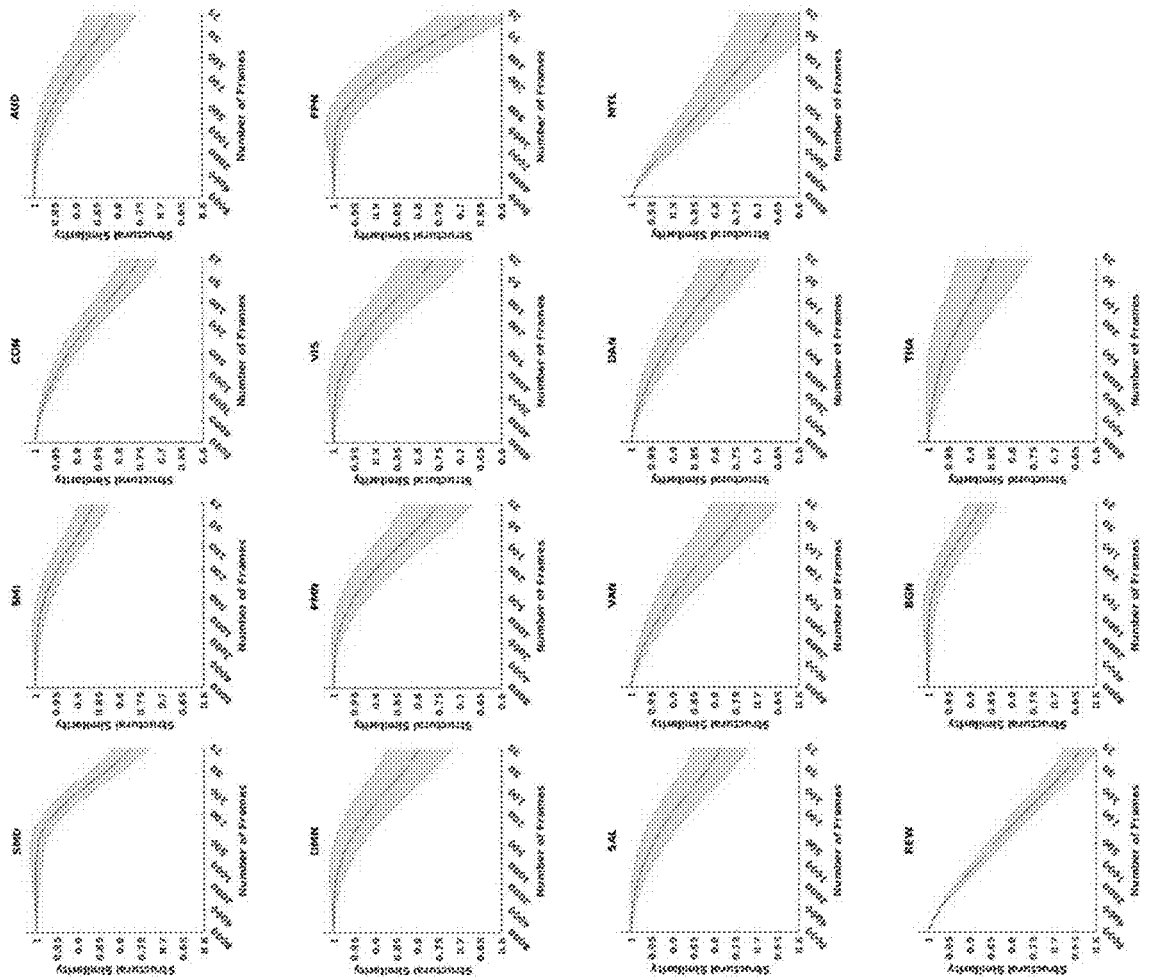
FIG. 15 depicts the structural stability variance per network.

However, stability varied per network as shown in FIG. 15.

Figure 16:
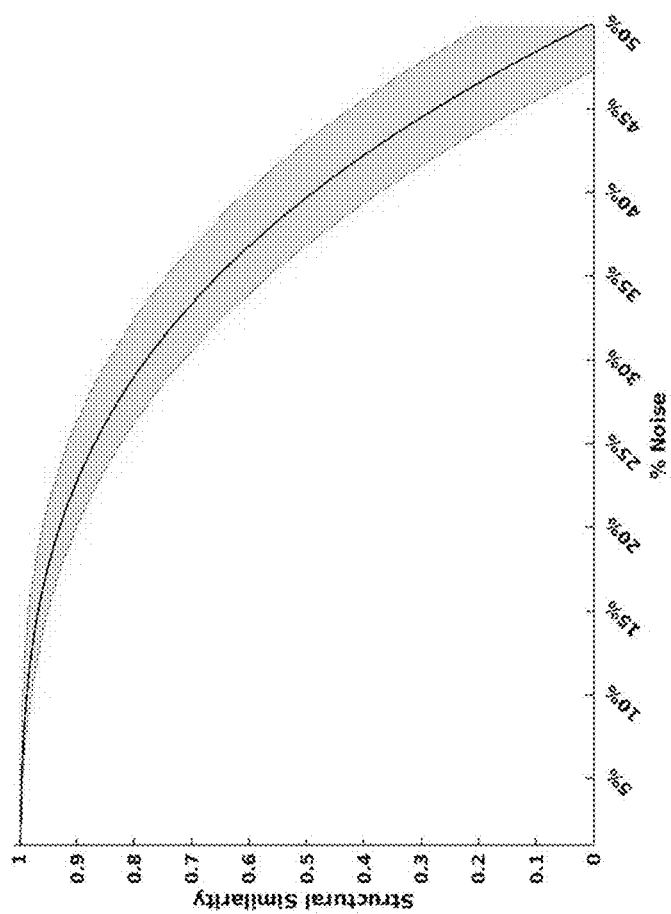
FIG. 16 shows the structural similarity when comparing model results on processed MSC BOLD data to the same data injected with varying amounts of pink noise and reprocessed.

FIG. 16 shows the structural similarity when comparing model results on processed MSC BOLD data to the same data injected with varying amounts of pink noise and reprocessed. Overall, the model maintained 0.9 structural similarity even after injecting 25%-30% noise in the original bold signal.

Figure 17:
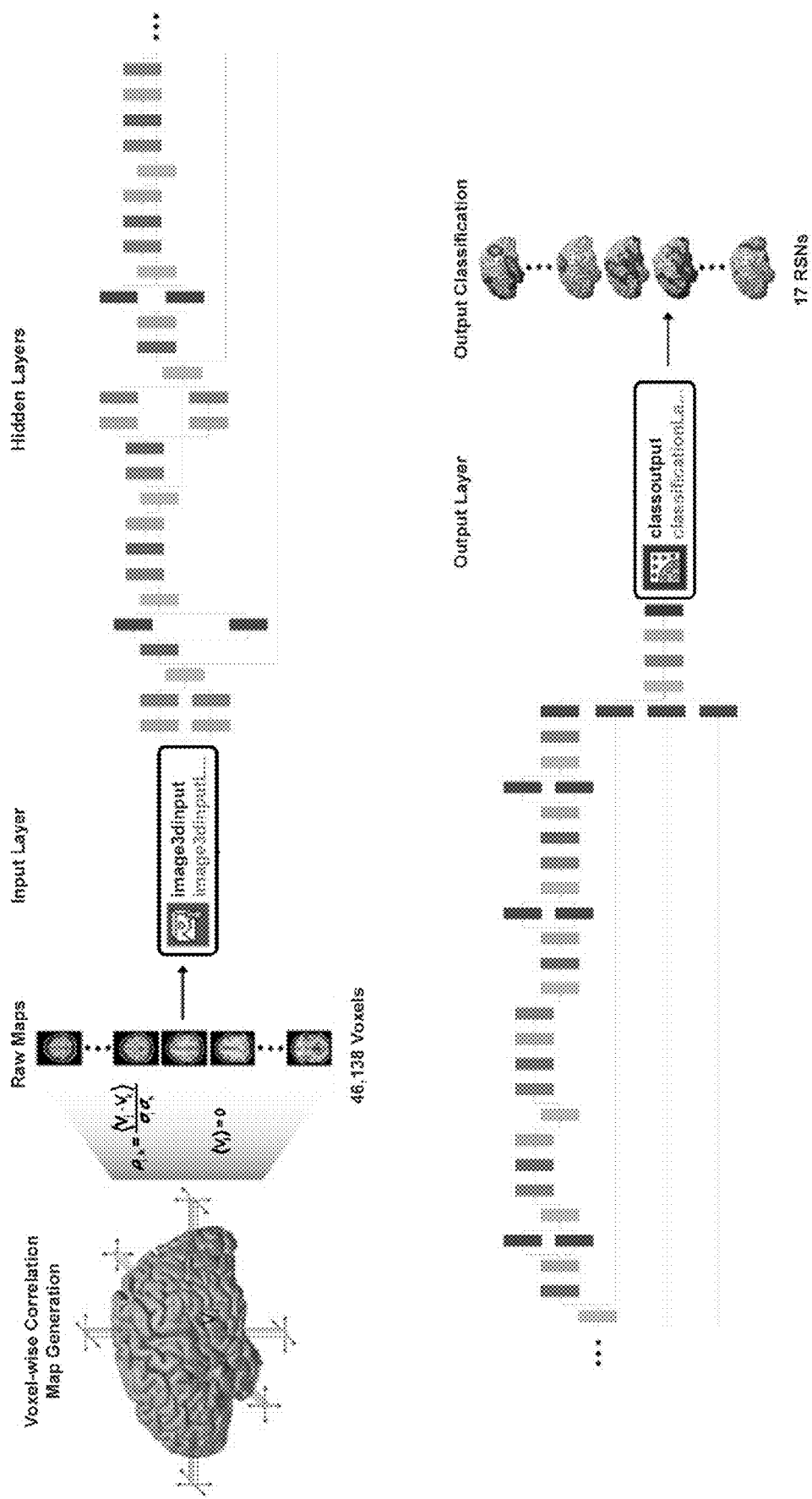
FIG. 17 is a simplified diagram of a deep learning workflow using a 3DCNN to produce resting state neural network maps.

FIG. 17 is a diagram of a deep learning workflow for an example 3DCNN that may be used in any of the example described herein.

Two steps may be performed prior to the steps shown in FIG. 17. The first step is to retrieve a subject's MRI data set, such as from an image repository. The MRI data set includes, for the subject, both (1) RS-fMRI brain scan data (which may be referred to as the raw RS-fMRI scan data) and (2) structural MR scan data. The second step is to perform preprocessing on the subject's MRI data set, For example, the fMRI data preprocessing may include, for example, compensation for slice dependent time shifts, elimination of systemic odd-even slice intensity differences due to interleaved acquisition, and rigid body correction for head movement within and across runs. Atlas transformation may be performed as part of the preprocessing and achieved by composition of affine transforms connecting the fMRI volumes with the T2-weighted and MPRAGE structural images, resulting in a volumetric time series, for example, in (3 mm cubic) atlas space. Additional preprocessing may include: spatial smoothing (e.g., 6 mm full width half maximum Gaussian blur in each direction), voxel-wise removal of linear trends over each run, and temporal low pass filtering retaining frequencies<0.1 Hz. Spurious variance may be reduced by regression of nuisance waveforms derived from head motion correction and extraction of the time series from regions of white matter and cerebral spinal fluid (CSF). The whole brain ("global") signal may be included as a nuisance regressor. Frame censoring may be performed to minimize the impact of head motion on the correlation results. Thus, frames (volumes) in which the root mean square (evaluated over the whole brain) change in voxel intensity relative to the previous frame exceeded some measure, for example, 0.5% (relative to the whole brain mean), may be excluded from the functional connectivity computations.

The third step is to generate voxel-wise correlation map (shown in FIG. 17, on the left hand side). A voxel-wise correlation map identifies, for each volume element (voxel) of the brain, a measure of the degree of time correlation between the spontaneous brain activations at a particular voxel of the brain and the spontaneous brain activations at every grey matter voxel of the brain (with standard masks being used to isolate gray matter voxels). In more detail, the correlation map consists of a calculated measure of time correlation (e.g., a Pearson-product moment correlation coefficient) reflecting the time correlation between the spontaneous brain activations that occurred over the course of RS-fMRI scan at one brain voxel compared to spontaneous brain activations that occurred over the course of the fMRI scan at a second brain voxel, and this calculation of a correlation coefficient will be done for every voxel pair. In other words, where n equals the number of applicable brain voxels to be mapped (46,138 in the FIG. 17 example), the voxel-wise time correlation map is a [48, 64, 48] matrix representing the calculated correlation coefficient of every voxel with the voxel that we mean to classify. In this voxel-wise correlation map, each voxel has one time correlation coefficient.

The fourth step is to input (image3dinput) the voxel-wise correlation map (i.e., the 46,138 raw correlation maps) generated in step 3 and to process the voxel-wise correlation map with the trained three-dimensional convolutional neural network (3DCNN) machine-learning algorithm to generate functional mapping output. The 3DCNN in this example consist of 73 layers with 3 dense blocks that performed 3 dimensional convolutions (yellow blocks), batch normalization (green blocks), transfer functions (leaky Relu, red blocks), and pooling (purple blocks).

The fifth step is to generate an output comprising a set of 17 functional connectivity (aka resting state network) output maps. Specifically, the 3DCNN classifies each correlation map into one of 17 resting state networks based on the maximum probability derived from the output of the model (classoutput). The processing by the 3DCNN generates, from a subject's MRI data set that includes rs-fMRI data, "functional connectivity" maps for the patient's brain that show the specific locations of, in the example shown in FIG. 17, seventeen separate groupings of functionally connected brain volume elements (voxels), which are also referred to as "resting state networks," or RSNs. These seventeen voxel groupings (RSNs) are each functionally connected because, for each of the seventeen voxel groupings, spontaneous brain activations occurring at each voxel are time correlated with spontaneous brain activations occurring at the other voxels in the same grouping. By design, the seventeen output voxel groupings correspond to seventeen brain functions of a predefined brain function topography or schema. (1) dorsal somatomotor (SMD), (2) ventral somatomotor (SMI), (3) cinguloopercular (CON), (4) auditory (AUD), (5) default mode (DMN), (6) parietal memory (PMN), (7) visual (VIS), (8) frontoparietal (FPN), (9) salience (SAL), (10) ventral attention (VAN), (11) dorsal attention (DAN), (12) medial temporal (MET), (13) reward (REW), (14) basal ganglia (BGN), (15) thalamus (THA), (16) cerebellum (CRB), and (17) noise/nuisance/other (OTH). In other embodiments, an alternative brain function topology that may be used in the 3DCNN includes seven (rather than seventeen) major brain functions (aka RSNs), as follows: (1) Dorsal Attention Network (DAN); (2) Ventral Attention Network (VAN), which may be defined to also include the Cingulo-Opercular Network (CO); (3) Sensorimotor (aka Somatomotor) Network (SMN), which may be defined to also included the auditory network (AN); (4) Visual Network (VIS); (5) Frontoparietal Control Network (FPC); (6) Language Network (LAN); and (7) Default Mode Network (DMN).

The 3DCNN is a supervised machine learning algorithm that utilizes training data with known class labels to iteratively adjust the weights within the layers of the network in order to define a mapping between the training samples and the known class labels. After training, the 3DCNN is used by the device to produce a probability for the classification of each voxel to a certain brain function of the predefined brain functions of the topology employed (e.g., 17 separate brain functions or RSNs as in the FIG. 17 example).

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

The methods and systems may be implemented using computer programming or engineering techniques including computer software, firmware, hardware, or any combination or subset.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally, or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may include example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about patient's likelihood to develop peripheral neuropathy.

Based upon these analyses, the processing element may learn how to identify characteristics and patterns that may then be applied to analyzing image data, model data, and/or other data. For example, the processing element may learn, to identify trends that precede developing peripheral neuropathy based upon comparisons of different ratings from a plurality of patients over time. The processing element may also learn how to identify trends that may not be readily apparent based upon collected scan data, such as trends that precede a patient developing peripheral neuropathy.

In the exemplary embodiment, a processing element may be instructed to execute one or more of the processes and subprocesses described above by providing the processing element with computer-executable instructions to perform such steps/sub-steps, and store collected data (e.g., trust stores, authentication information, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity and efficiency of computer networks and the devices on those networks at the server-side, and by further enabling the easier and more efficient identification an mapping of resting state neural networks. The present embodiments therefore improve the speed, efficiency, and reliability in which such determinations and processor analyses may be performed. Due to these improvements, the aspects described herein address computer-related issues that significantly improve the efficiency of healthcare diagnostics in comparison with conventional techniques.

Exemplary embodiments of systems and methods for categorization of patients for likelihood of developing peripheral neuropathy based on hypersensitivity to cold assessments are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for mapping brain function of a subject, the method comprising:
receiving a dataset of time-series resting state fMRI (RS-fMRI) comprising a series of individual three dimensional (3D) image frames of the subject's brain, wherein each frame represents a snapshot in time over the course of the RS-fMRI scan and the dataset comprises less than about 200 individual 3D image frames;
inputting the 3D image frames to a 3D convolutional neural network designed to account for the spatial relationship between voxels by performing three dimensional convolutions, wherein for each voxel of the subject's brain and for each defined resting state network of a plurality of defined resting state networks the 3D convolutional neural network calculates a probability that the voxel belongs to each of the resting state networks, each of the plurality of defined resting state networks is characterized by its location being in a same general region across a population of subjects but where there is significant variability in network boundaries at an individual level, and the 3D convolutional neural network is trained beforehand using a plurality of 3D image frames including previously defined resting state networks obtained from a plurality of calibration subjects; and
generating one or more functional map of the plurality of resting state networks of the subject's brain using the probabilities calculated by the 3D convolutional neural network.

2. The method of claim 1, wherein the 3D image frames of the subject's brain are input to the 3D convolutional neural network as tensors.

3. The method of claim 1, wherein the dataset comprises less than about 150 3D image frames.

4. The method of claim 1, further comprising generating 3D correlation maps correlating each voxel in each 3D image frame to other time correlated voxels in the 3D image frame.

5. The method of claim 4, wherein inputting the 3D image frames to the artificial neural network comprises inputting the generated 3D correlation maps to the 3D convolutional neural network.

6. A method for mapping brain function of a subject, the method comprising:
receiving a dataset of time-series resting state fMRI (RS-fMRI) comprising a series of individual three dimensional (3D) image frames of the subject's brain, wherein each frame represents a snapshot in time over the course of the RS-fMRI scan;
inputting the 3D image frames to a a 3D convolutional neural network designed to account for the spatial relationship between voxels by performing three dimensional convolutions, wherein for the subject's brain and for each defined resting state network of a plurality of defined resting state networks the 3D convolutional neural network calculates a probability that the voxel belongs to each of the resting state networks, each of the plurality of defined resting state networks is characterized by its location being in a same general region across a population of subjects but where there is significant variability in network boundaries at an individual level, and the 3D convolutional neural network is trained beforehand using a plurality of 3D image frames including previously defined resting state networks obtained from a plurality of calibration subjects; and
generating one or more functional map of the plurality of resting state networks of the subject's brain using the probabilities calculated by the 3D convolutional neural network.

7. The method of claim 6, wherein the 3D image frames of the subject's brain are input to the 3D convolutional neural network as tensors.

8. The method of claim 6, further comprising generating 3D correlation maps correlating each voxel in each 3D image frame to other time correlated voxels in the 3D image frame.

9. The method of claim 8, wherein inputting the 3D image frames to the 3D convolutional neural network comprises inputting the generated 3D correlation maps to the 3D convolutional neural network.

10. A method for mapping of brain function of a subject for a purpose for which a first number of resting state fMRI (RS-fMRI) individual three dimensional (3D) image frames of the subject's brain is typically acquired, the method comprising:

receiving a dataset of time-series RS-fMRI comprising a series of individual 3D image frames of the subject's brain, wherein each frame represents a snapshot in time over the course of the RS-fMRI scan and the dataset comprising less than half of the first number of individual 3D image frames;

inputting the 3D image frames to a 3D convolutional neural network account for the spatial relationship between voxels by performing three dimensional convolutions, wherein for each voxel of the subject's brain and for each defined resting state network of a plurality of defined resting state networks the 3D convolutional neural network calculates a probability that the voxel belongs to each of the resting state networks, each of the plurality of defined resting state networks is characterized by its location being in a same general region across a population of subjects but where there is significant variability in network boundaries at an individual level, and the 3D convolutional neural network is trained beforehand using a plurality of 3D image frames including previously defined resting state networks obtained from a plurality of calibration subjects; and generating one or more functional map of the plurality of resting state networks of the subject's brain using the probabilities calculated by the 3D convolutional neural network.

11. The method of claim 10, wherein the 3D image frames of the subject's brain are input to the 3D convolutional neural network as tensors.

12. The method of claim 10, wherein the purpose comprises pre-surgical planning in a patient with brain tumors and epilepsy, and the first number of RS-fMRI 3D image frames is more than 1000.

13. The method of claim 12, wherein the dataset comprising less than half of the first number of 3D image frames comprises less than 200 3D image frames.

* * * * *